US006682223B2

(12) United States Patent
Sugimori et al.

(10) Patent No.: US 6,682,223 B2
(45) Date of Patent: *Jan. 27, 2004

(54) BALL BEARING

(75) Inventors: Youichiro Sugimori, Kanagawa (JP);
Yasushi Mutoh, Kanagawa (JP);
Michiharu Naka, Kanagawa (JP);
Takashi Ogawa, Kanagawa (JP);
Yasuhisa Terada, Kanagawa (JP);
Hiroshi Ishiwada, Kanagawa (JP)

(73) Assignee: NSK Ltd., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 10/107,046

(22) Filed: Mar. 28, 2002

(65) Prior Publication Data

US 2003/0077015 A1 Apr. 24, 2003

(30) Foreign Application Priority Data

Mar. 28, 2001 (JP) ..................................... P.2001-092962
Mar. 22, 2002 (JP) ..................................... P.2002-080862

(51) Int. Cl.⁷ ............................ F16C 33/66; F16C 33/58
(52) U.S. Cl. ........................................ 384/462; 384/516
(58) Field of Search ................................ 384/450, 513, 384/516, 523, 533, 470, 462

(56) References Cited

U.S. PATENT DOCUMENTS 5,575,569 A * 11/1996 Shinohara ................... 384/470

| 6,074,099 | A | | 6/2000 | Mutou et al. |
| 6,082,906 | A | | 7/2000 | Satou et al. |
| 6,273,615 | B1 | * | 8/2001 | Obara et al. ................ 384/523 |
| 6,329,326 | B1 | * | 12/2001 | Iso et al. .................... 508/182 |
| 6,568,856 | B2 | * | 5/2003 | Sugimori et al. ........... 384/462 |

FOREIGN PATENT DOCUMENTS

| JP | 11-125256 A | 5/1999 |
| JP | 3035818 A | 2/2000 |
| JP | 2000-328087 A | 11/2000 |

* cited by examiner

*Primary Examiner*—Thomas R. Hannon
(74) *Attorney, Agent, or Firm*—Sughrue Mion, PLLC

(57) ABSTRACT

A ball bearing is described, which comprises an outer ring having on its inner periphery an outer raceway, an inner ring having on its outer periphery an inner raceway, plural balls rotatably disposed between the outer raceway and the inner raceway, a cage holding the plural balls in a freely rotatable manner, and a grease packed in a space between the outer raceway and the inner raceway, wherein the inner peripheral surface of each pocket of the cage contains a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket.

31 Claims, 13 Drawing Sheets

① A REGION SATISFYING THE FIRST ASPECT OR
   THIRD ASPECT OF THE PRESENT INVENTION
② A MORE PREFERABLE REGION
③ A STILL MORE PREFERABLE REGION
④ A MOST PREFERABLE REGION

BALL BEARING

FIELD OF THE INVENTION

The present invention relates to a ball bearing used in various motors, which are used for a general industrial purpose. More particularly, the invention relates to a ball bearing which reduces the noise, vibration, fretting damage (abrasion) and torque of the ball bearing, and improves the acoustic durability of the cage noise.

BACKGROUND OF THE INVENTION

An example of such for the general industrial purpose is a motor device for driving an air conditioning apparatus (referred to as an air conditioner). Recently, the air conditioner has been improved to have high performances and a multifunctionality. The air conditioner is operated in the following way, for example. Under control of the inverter unit, the air conditioner is operated at high speed to effect a rapid cooling and to lower room temperature in the shortest possible time. Then, it is operated at low speed to keep the room at constant temperature. In such circumstances, when the air conditioner is operated at the low speed, low noise operation is required, viz., it is operated generating reduced noises of the air blowing, the motor rotation and the like. In the low speed operation, the cooling efficiency within the apparatus decreases, the temperature of the rolling bearing incorporated into the motor increases to sometimes reach 100 to 120° C. In this condition, it is difficult to secure a thickness of the oil film formed by the lubrication, the grease packed in the ball bearing is liable to deteriorate. With progress of the deterioration, noise will be generated.

In the outdoor unit used for the air conditioner, the initial noise (cage noise) of the bearing sometimes is required to reduce at the start operation in low temperature environment, e.g., in winter season. Furthermore, the motor units of air-conditioners with rolling bearings installed therein are sometimes transported over long distances from a motor manufacturer to end users by a truck. In such a long distance transportation, the truck traces the fine unevenness of roads, and the associated movement is transmitted to the rolling bearing in the form of repetitive impact loads, which cause the rolling element of the rolling bearing to repeatedly put into microscopic contact with the raceway surface. Such microscopic contacts sometimes cause a fretting damage (abrasion) on the raceway surface, and the damage acts as a source of noise.

Taking account of environmental regulations as well as the achieving of high performances and multifunctionality, efforts have been made to downsize the motor and to realize the lower output of the motor in order to reduce the heat generation of the motor. For this reason, it is recognized that the torque characteristic has a vital function in the rolling bearings having those uses. The dynamic frictional torque of the rolling bearing is caused by the frictions by a minute slip on the rolling contact surface, sliding friction at the sliding contact part in the bearing, and viscosity resistance of the grease. It is known that the viscosity resistance of the grease is affected by the kinematic viscosity of the base oil and the worked penetration of the grease. Accordingly, the kinematic viscosity of the base oil is based on a shearing resistance of the oil when a fluid lubricating film is formed. In this sense, reduction of the kinematic viscosity plays an important role in reducing the dynamic frictional torque of the rolling bearing. The grease worked penetration affects the channeling performance when it is sheared within the bearing when the bearing rotates. In this sense, the approach of reducing the worked penetration of the grease presents an effective solution to the reducing of the dynamic frictional torque of the rolling bearing.

When the kinematic viscosity of the base oil is reduced, because sometimes the motor of the air conditioner is rotated at relatively low speed under the inverter control, it is difficult to secure the thickness of the oil film. Generally, the oil of low kinematic viscosity is low in heat resistance, and a problem arises in the acoustic durability. The reduction of the worked penetration of the grease results in the addition amount of the thickener. In this case, the amount of the base oil decreases relative to the amount of other compositions in the grease, and the resisting force of the grease to the mechanical shear increases. As a result, an amount of supplying of the base oil to the lubricating surface of the bearing reduces, and it is impossible to stably maintain the lubricating property of the oil for a long term.

Thus, there is a limit in reducing the kinematic viscosity and the worked penetration of the grease. In the rolling bearing having the uses mentioned above, the following values are considered appropriate: the kinematic viscosity of the base oil is 10 to 500 mm$^2$/s at 40° C., the worked penetration of the grease is NLGI grades No. 2 to 3, or the thickener is contained in an amount of 5 to 20% by mass based on the total amount of the grease composition. Particularly, in the motor which requires the low noise characteristic, i.e., acoustic durability, a grease is generally used which prepared by blending a fatty acid lithium salt as a thickener into an ester as a base oil. The heat resistance of an ester oil is higher than that of the mineral oil. The ester oil contains a polar group in the molecular structure. The polar group functions to increase the sorbability to the metallic surface, to improve the friction characteristic and the acoustic durability. Further, where the reduction of the fretting damage (abrasion) is required, it is effective to use a base oil of high oil film forming property and relatively high viscosity.

For example, a ball bearing as shown in FIG. 1 is known for the rolling bearing having the uses stated above. The ball bearing is constructed such that an inner ring 2 having inner raceway 1 formed on its outer peripheral surface and an outer ring 4 having an outer raceway 3 formed on its inner peripheral surface are coaxially disposed. A plurality of balls 5, 5 are rotatably disposed between the inner raceway 1 and the outer raceway 3. In the illustrated case, the inner raceway 1 and the outer raceway 3 are both of the deep groove type. The balls 5, 5 are rotatably retained in pockets 7, 7 provided in a cage 6.

The cage 6 is called a wave press cage (a corrugated press cage). To form the cage 6, a metal plate is molded into an element 8, wavy and annular in shape, by press molding, and a couple of elements 8, 8 so shaped are combined. Concave parts 9, 9, semicylindrical in shape, are formed at a plurality of positions on the element 8 as viewed circumferentially. Those concave parts 9, 9 are used for forming the pockets 7, 7. The couple of elements 8, 8 are butted against each other at positions apart from the concave parts 9, 9 thereof. Those butted parts are joined and fixed by a plurality of rivets 10 to thereby form a cage 6, annular in shape. The thus formed cage 6 includes pockets 7, 7 arranged at plural positions as viewed circumferentially. A middle part of the inner surface of the concave part 9 is spherically concaved to be arcuate in cross section, with the radius of curvature being slightly larger than that of the outer surface of each ball 5. Accordingly, when the couple of elements 8, 8 are butted against each other, the concave parts 9, 9 are combined to form a pocket 7.

When the ball bearing is used, the inner ring 2 and the outer ring 4 are rotatable relative to each other with the rolling of the balls 5, 5. The balls 5, 5 revolve around the inner ring 2 while rolling about its axis. The cage 6 moves (rotates) around the inner ring 2 at a speed equal to the revolving speed of each ball 5.

A space between the outer peripheral surface of the inner ring 2 and the inner peripheral surface of the outer ring 4 is packed with a lubricant, such as grease or another lubricant, to thereby make the relative rotation smooth. The lubricant of the space prevents the ball bearing from being vibrated or generating noise, and further prevents such a trouble as the seizure from occurring. In the ball bearing for the air conditioner, both end openings of a space between the outer periphery surface of the inner ring 2 and the inner periphery surface of the outer ring 4 are closed by sealing members, such as sealing plates or shielding plates, thereby preventing a lubricant from leaking from the space or preventing foreign matter, e.g., dust, from entering the space. The ball bearing not having such sealing members is illustrated in FIG. 1.

The radii of curvature of the cross-sectional shapes of the inner and outer raceways can be designed in various manners depending on the level of load and rotating speed. But usually the radius of curvature of the inner raceway as well as the outer raceway is made equal to 52% of the ball diameter. This is based on the fact that, in Interpretative Table 2 'Radii of raceway grooves and decreasing coefficient' of "Method of Calculating Dynamic Load Rating and Standard Life of Rolling Bearing—Interpretation" in JIS standard (JIS B 1518-1992), the radius of curvature of the cross-sectional shape is made equal to 52% of the diameter of the rolling element for the calculation of the dynamic load rating of a deep groove ball bearing. Also, in the bearing catalogue published by the present applicant, dynamic and static load rating are calculated with the assumption of the radii of curvature of the cross-sectional shapes of the inner raceway and the outer raceway being 52% of the diameter of the rolling element. As is seen from these facts, the radii of curvature of the cross-sectional shapes of the inner raceway and the outer raceway are usually made equal to 52% of the diameter of the rolling element.

In the case of the ball bearing mentioned above, even if it is packed or supplied with a necessary amount of lubricant, the cage 6 is caused to vibrate. This leads to generation of noise called cage noise and a vibration of the cage. Such a vibration of the cage 6 is caused by a sliding friction between the balls 5, 5 and the cage 6, which is due to the fact that an amount of motion of the cage 6 is larger than that of the balls 5, 5. A measure conventionally taken for suppressing the cage noise is to reduce the motion amount of the cage 6 to the balls 5, 5 by reducing a clearance between the inner surface of the pockets 7, 7 and the rolling surface of the balls 5, 5.

However, sometimes the cage noise generation is still present even if the amount of motion of the cage 6 to the balls 5, 5 is reduced when the operating condition is severe, for example, when an insufficient amount of lubricant is supplied. This is due to a configuration of the inner periphery surface of the pocket 7 of the cage 6. Specifically, in the conventional cage 6 shown in FIG. 1, the inner peripheral surface of the pocket 7 may be in sliding contact with the rolling surface of the ball 5 over the substantially entire surface of the pocket. Therefore, a friction force acting on the inner periphery surfaces of those pockets and the rolling surfaces of the balls is large. This will be described in detail with reference to FIGS. 20 and 21.

In the conventional structure of the cage shown in FIG. 1, as indicated by tilt lattice in FIGS. 20 and 21, most of each concave part 9 of the inner peripheral surface of each pocket 7 serves, over its substantially full width, as a spherical part 15 which functions as a holding guide surface the radius of curvature of which is somewhat larger than that of the rolling surface of the ball 5 (FIGS. 1 and 23). When the inner peripheral surface of the pocket 7 is formed, over its full width, as the spherical part 15 functioning as the holding guide surface, the friction area between the inner peripheral surface of the pocket 7 and the rolling surface of the ball 5 is increased. A frictional vibration generated at a sliding contact part between the cage 6 and the ball 5 grows, thereby giving rise to vibration and noise. In a case where each pocket 7 is configured over its full width as a spherical part 15 as a single spherical surface, if the center $O_{15}$ (FIG. 23) of each spherical part 15 of each pocket is set off from the center $O_5$ (FIGS. 23 and 24) of the ball 5 as retained in the pocket 7, the lubricant sticking to the rolling surface of the ball 5 is scraped from the rolling surface, and the vibration and the noise remarkably grows. This will be described in detail with reference to FIGS. 22 to 24 by using a wave press cage as shown in FIG. 1.

In the conventional cage 6, the spherical parts 15 defining each pocket 7 are each configured as a single spherical surface where the radius of curvature $R_{15}$ of the spherical part 15 is somewhat larger than that $R_5$ of the ball 5 as shown in FIG. 22 ($R_{15} > R_5$). A depth $D_7$ of the pocket 7, ½ as large as the inner dimension of the pocket 7 as viewed in the widthwise direction of the cage 6, is slightly smaller than the radius of curvature $R_{15}$ of the spherical part 15 as exaggeratedly illustrated in FIG. 23.

In the ball bearing with such a cage 6 incorporated thereinto, when it is operating, the rolling surface of each ball 5 comes in contact with the inner peripheral surface of each pocket 7 in the cage 6. Those balls revolve while rolling at the same speed as of the cage 6. The revolving speeds of those balls 5 are not exactly equal to one another, viz., those balls revolve while being minutely lagged and advanced. This is due to shape errors of the inner raceway 1 and the outer raceway 3 (FIG. 1), diametrical size variation of the balls per se, an inclination of the ball bearing (offset between the center axes of the inner ring 2 and the outer ring 4), and others. As a result, some balls 5 push the cage 6 in the revolving direction, while the cage 6 pushes the balls 5. In either case, the rolling surfaces of the balls 5 come in contact with the spherical parts 15 defining the inner peripheral surfaces of the pockets 7. That is, since the radius of curvature $R_{15}$ of the spherical part 15 is larger than that the radius of curvature $R_5$ of each ball 5, the cage 6 displaces in the radial direction a distance corresponding to a clearance caused by the difference between the radii of curvature $R_{15}$ and $R_5$, as shown in FIG. 23. In this condition, the rolling surface of each ball 5 comes in sliding contact with the spherical parts 15 defining each pocket 7. Specifically, as shown in FIGS. 23 and 24, the spherical parts 15 defining each pocket 7 are brought into sliding contact with the rolling surface of the ball 5 on both sides of the cage 6 as viewed in the widthwise direction of the cage 6 (vertical direction in FIG. 23 and horizontal direction in FIG. 24) at two points $P_1$ and $P_2$ each displaced from the center of the pocket 7 as viewed in the circumferential direction to the ends as viewed in the circumferential direction.

When the center $O_7$ of the pocket 7 of the cage 6, as shown in FIG. 24, is set off from the center $O_5$ of the ball 5 toward the inner side owing to the clearance caused by the difference between the radii of curvature $R_{15}$ and $R_5$, a part of the rolling surface of the ball 5, which is closer to the outer diameter of the cage 6 comes in sliding contact with a part of the spherical part 15 forming the inner peripheral surface of the pocket 7, which is close to the outer diameter of the cage 6. Accordingly, the lubricant, such as grease or oil, which is supplied for lubricating the ball bearing and sticks to the rolling surface of each ball 5, is scraped off with the edge of the spherical part 15, and the scraped one is pushed outside while not taken into the pocket 7. On the other side of the cage 6 as viewed in the circumferential direction, a part of the rolling surface of the ball 5, closer to the inner diameter of the cage 6 is in sliding contact with a part of the spherical part 15 defining the inner peripheral surface of the pockets 7, closer to the inner diameter of the cage 6. Also in this case, the pocket fails to take the lubricant thereinto.

As the result of the lubricant taking-in failure, the coefficient of sliding friction at the sliding part between the rolling surface of each ball 5 and the spherical part 15 defining the inner peripheral surface of each pocket 7 of the cage 6, increases. When the friction coefficient has increased, a frictional torque of the ball bearing having the cage 6 assembled thereinto will vary or increase. Further, a friction noise is generated at the time of operation. In some cases, the friction noises will greatly grow.

SUMMARY OF THE INVENTION

Accordingly, an object of the present invention is to provide a ball bearing which succeeds in reducing the noise, vibration, fritting damage (abrasion) and torque of the ball bearing, and in improving the acoustic durability of the cage noise.

To achieve the object, the invention provides the following ball bearings of the first to fourth aspects.

(1) A ball bearing comprising an outer ring having on its inner periphery an outer raceway, an inner ring having on its outer periphery an inner raceway, plural balls rotatably disposed between the outer raceway and the inner raceway, a cage holding the plural balls in a freely rotatable manner, and a grease packed in a space between the outer raceway and the inner raceway, wherein the grease comprises a base oil comprising a lubricant having a polar group in its molecular structure and a non-polar lubricant and a metallic soap-based thickener containing a long fibrous material whose fiber length is at least 3 $\mu$m in an amount of at least 30% by mass based on the total amount of the thickener; the inner peripheral surface of each pocket of the cage comprises a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket; and the radius of curvature of the cross-sectional shape of the inner raceway and the radius of curvature of the cross-sectional shape of the outer raceway are in the range of from 51.0% to smaller than 60.0% of the diameter of each ball.

(2) A ball bearing comprising an outer ring having on its inner periphery an outer raceway, an inner ring having on its outer periphery an inner raceway, plural balls rotatably disposed between the outer raceway and the inner raceway, a cage holding the plural balls in a freely rotatable manner, and a grease packed in a space between the outer raceway and the inner raceway, wherein the grease comprises a base oil and a metallic soap-based thickener containing a fibrous material whose fiber length is at least 3 $\mu$m in an amount smaller than 30% by mass based on the total amount of the thickener; the inner peripheral surface of each pocket of the cage comprises a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket; and the radius of curvature of the cross-sectional shape of the inner raceway is in the range from 51.5% to 56.0% of the diameter of each ball and the radius of curvature of the cross-sectional shape of the outer raceway is in the range from 52.5% to 58.0% of the diameter of each ball.

(3) A ball bearing comprising an outer ring having on its inner periphery an outer raceway, an inner ring having on its outer periphery an inner raceway, plural balls rotatably disposed between the outer raceway and the inner raceway, a cage holding the plural balls in a freely rotatable manner, and a grease packed in a space between the outer raceway and the inner raceway, wherein the grease comprises a base oil comprising a lubricant having a polar group in its molecular structure and a non-polar lubricant, and a metallic soap-based thickener containing a long fibrous material whose fiber length is at least 3 $\mu$m in an amount of at least 30% by mass based on the total amount of the thickener; the cage is in the shape of circular ring as a whole and comprises pockets for receiving and holding the respective balls with its pocket surface at plural places in its circumferential direction and an opening whose width is smaller than the diameter of the ball on one side of the axial direction of each pocket, while a ratio $\delta$/Da of an axial clearance $\delta$ provided between the rolling surface of the ball in the axial direction and the pocket surface to the diameter Da of each ball is set in a range from −0.01 to 0.02; and the radius of curvature of the cross-sectional shape of the inner raceway and the radius of curvature of the cross-sectional shape of the outer raceway are in the range from 51.0% to smaller than 60.0% of the diameter of each ball.

(4) A ball bearing comprising an outer ring having on its inner periphery an outer raceway, an inner ring having on its outer periphery an inner raceway, plural balls rotatably disposed between the outer raceway and the inner raceway, a cage holding the plural balls in a freely rotatable manner, and a grease packed in a space between the outer raceway and the inner raceway, wherein the grease comprises a base oil and a metallic soap-based thickener containing a fibrous material whose fiber length is at least 3 $\mu$m in an amount smaller than 30% by mass based on the total amount of the thickener; the cage is in the shape of circular ring as a whole and comprises pockets for receiving and holding the respective balls with its pocket surface at plural places in its circumferential direction and an opening whose width is smaller than the diameter of the ball on one side of the axial direction of each pocket, while a ratio $\delta$/Da of an axial clearance $\delta$ provided between the rolling surface of the ball in the axial direction and the pocket surface to the diameter Da of each ball is set in a range from −0.01 to 0.02; and the radius of curvature of the cross-sectional shape of the inner raceway is in the range from 51.5% to 56.0% of the diameter of each ball and the radius of curvature of the cross-sectional shape of the outer raceway is in the range from 52.5% to 58.0% of the diameter of each ball.

The ball bearing of the first or second aspect of the present invention contains a cage constituted as above. In the cage thus constructed, the inner peripheral surface of each pocket rubs on the rolling surface of each ball only on the spherical part, not on the curved parts. A clearance is present between the curved part and the rolling surface, and is larger than the clearance between the spherical part and the rolling part of the ball. Accordingly, a friction area between the inner peripheral surface of each pocket and the rolling surface of the ball is reduced, and further the lubricant (grease) is smoothly and effectively taken into the clearance between the spherical part and the rolling surface. With those operations, a friction acting on the sliding contact part between the cage and the ball is more lessened. A frictional vibration generated at the sliding contact part is lessened, and the vibration and noise are lessened.

By making the radius of curvature of the cross-sectional shape of the inner raceway 51.5% to 56.0% of the diameter of the ball, and the radius of curvature of the cross-sectional shape of the outer raceway 52.5% to 58.0% of the diameter of the ball in the ball bearing of the above-described first aspect of the present invention and the ball bearing of the above-described second aspect of the present invention, the elastic deformation of the contact portion in the rolling surface of the ball with the inner raceway surface or the outer raceway surface is reduced. In other words, the Hertian contact ellipse becomes smaller, thus the differential slippage is reduced, resulting in the reduction of bearing torque. Simultaneously, against the impact loading repetitively applied during transportation, fretting damages (abrasion) can be reduced which occur at the inner raceway surface or the outer raceway surface, leading to the improvement of acoustic durability. With a radius of curvature of the cross-sectional shape of the inner raceway or the outer raceway larger than the upper limit mentioned above, the maximum Hertian contact pressure at the contact elliptic area becomes too large, thus shortening the rolling fatigue life of the inner raceway or the outer raceway. Hence, an unfavorable acoustic property and a short flaking life result. By making the radius of curvature of the cross-sectional shape of the outer raceway larger than the radius of curvature of the cross-sectional shape of the inner raceway, the difference of the contact surface pressure between the rolling surface of the ball and the inner raceway or the outer raceway can be decreased.

In the ball bearing of the above-described first aspect of the invention, bearing torque can be reduced due to the use of the above-specified grease composition. The long fibrous material having a fiber length of at least 3 μm contained in the thickener for the grease composition in an amount of 30% by mass or larger is oriented by the shearing force exerted by the rotation of the bearing, and acts to reduce the bearing torque. In particular, in the ball bearing of the above-described first aspect, this bearing torque-reducing effect is further enhanced by jointly using a non-polar lubricant in the base oil. Further, the lubricant having a polar group in its molecular structure (which will be called polar group-containing lubricant hereinafter) contained in the base oil plays a role similar to that of the conventional polar group-containing base oil (such as ester oils). The polar group is preferentially adsorbed on the contact surface for the rotary part of the bearing to form an adsorption film, which reduces the bearing torque through the improvement of surface frictional property. Still further, the polar group-containing lubricant interacts with the micelle structure of the metallic soap to reduce the bonding force between the long fibrous materials. Hence, the shear resistance of the grease during bearing rotation is reduced, resulting in a further reduction of bearing torque. Because of such mechanisms, even if the radius of curvature of the cross-sectional shape of the inner raceway or the outer raceway is made smaller than 52% of the diameter of the ball, an improved dynamic torque property is achieved compared to the property achieved in conventional specifications provided that the radius of curvature is at least 51% of the diameter of the ball.

Since the ball bearing of the above-described first or second aspect of the invention can reduce the friction acting between the raceway surface of the ball and the outer raceway and the inner raceway during the relative revolution of the outer ring and inner ring, heat generation inside the ball bearing can be effectively suppressed. As a result, the deterioration of the grease composition packed in the bearing is prevented to secure improved acoustic durability for the ball bearing.

On the other hand, the ball bearings of the above-described third or fourth aspect of the invention are the same in constitution as the ball bearings of the above-described first or second aspect of the invention, respectively, except for incorporating a cage comprising pockets each having a specific shape, so-called "crown-type cage". Accordingly, the ball bearings of the above-described third or fourth aspect of the invention take the same effects as those of the ball bearings of the above-described first or second aspect of the invention, respectively

Figure 1:
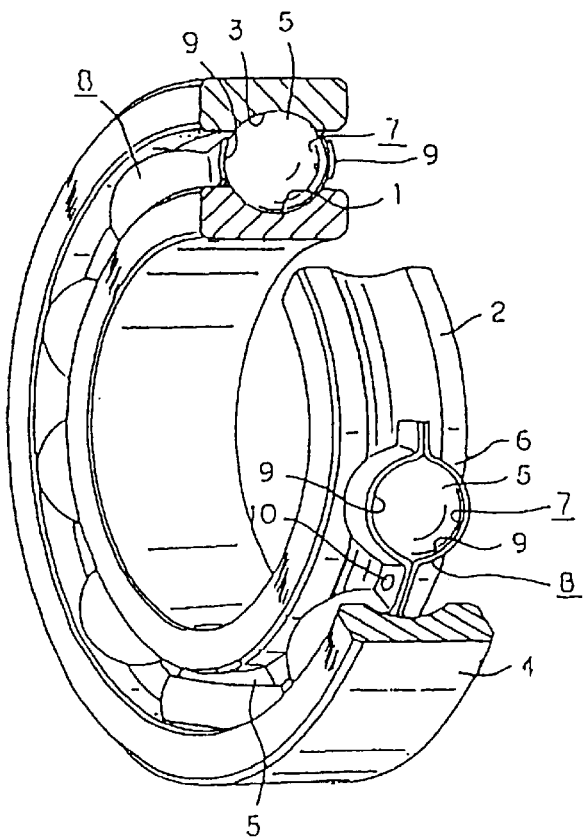
FIG. 1 is a perspective view, partly broken, showing a ball bearing constructed according to the present invention.

Reference Numerals and Names
1 Inner raceway
2 Inner ring
3 Outer raceway
4 Outer ring
5 Ball
6 Cage
7 Pocket
8 Element
9 Concave part
15 Spherical part
18 Curved part
20 Housing
21 Test bearing
22 Coil (Stator)
23 Rotor
30 Measuring apparatus for torque test
31 Test bearing
32 Drive spindle
33 Shaft
34 Pre-loading wave washer
35 String
36 Load converter
37 X-Y recorder
40 Measuring apparatus for fretting test
41 Test bearing
42 Outer ring housing
43 Shaft
44 Vibrator
50 Crown-type cage
52 Pocket surface
58 Pocket

DETAILED DESCRIPTION OF THE INVENTION

A ball bearing constructed according to the present invention will be described in detail with reference to the accompanying drawings.

The numeral expressed with the unit "% by mass" as used herein is the almost the same as the numeral expressed with the unit "% by weight".

(Ball Bearing of the Above-Described First Aspect)

In the ball bearing of the above-described first aspect of the present invention, there is no limitation on the structure of the ball bearing, except the configuration of a cage to be described later and the radius of curvature of the cross-sectional shape of the inner raceway or the outer raceway to the diameter of the ball. The ball bearing may have, for example, a structure shown in FIG. 1. The ball bearing is constructed such that an inner ring 2 having inner raceway 1 formed on the outer peripheral surface and an outer ring 4 having an outer raceway 3 formed on the inner peripheral surface are coaxially disposed. A plurality of balls 5, 5 as rolling elements are arranged to be free to roll between the inner raceway 1 and the outer raceway 3. In the illustrated case, the inner raceway 1 and the outer raceway 3 are both of the deep groove type. The balls 5, 5 are rollably retained between pockets 7, 7 provided in a cage 6. The cage 6 is called a wave press cage. To form the cage 6, a metal plate is molded into an element 8, wavy and annular in shape, by press molding, and a couple of elements so shaped are combined. Concave parts 9, 9, semicylindrical in shape, are formed at a plurality of positions on the element 8 as viewed circumferentially. Those concave parts 9, 9 are used for forming the pockets 7, 7. The couple of elements 8, 8 are butted against each other at positions apart from the concave parts 9, 9 thereof. Those butted parts are joined and fixed by a plurality of rivets 10 to thereby form a cage 6, annular in shape. The thus formed cage 6 includes pockets 7, 7 arranged at plural positions as viewed circumferentially.

In the present invention, the inner surface of the cage 6 is configured to have a spherical part as a spherical concave surface whose radius of curvature is slightly larger than that of the ball 5, and a curved part which has the radius of curvature being larger than that of the spherical part and is smoothly continuous from the end of the spherical part toward the end thereof on the opening side of the pocket 7.

Figure 2:
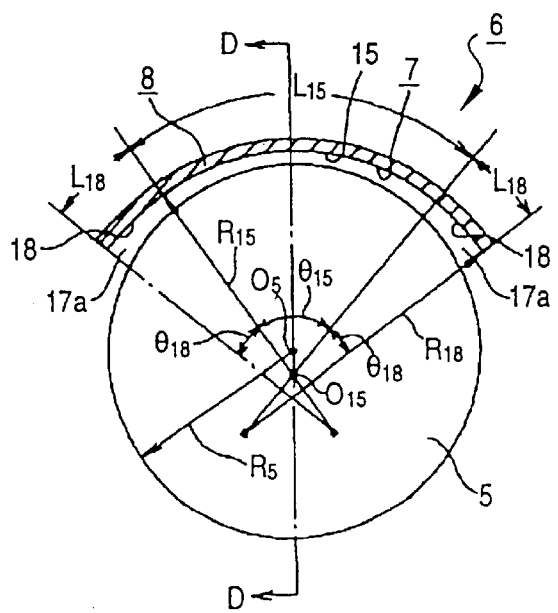
FIG. 2 is a cross sectional view showing a cage to be incorporated into the ball bearing of the invention.

FIG. 2 is a cross sectional view showing the cage 6 taken along the widthwise direction thereof. The inner peripheral surface of each pocket 7 is formed to have a spherical part 15 located at the middle part and curved parts 18 continuously extending from both ends of the spherical part. The spherical part 15 is formed as a spherical curved part formed over almost the entire length of the inner peripheral surface of the pocket 7, with the radius of curvature $R_{15}$ being slightly larger than radius of curvature $R_5$ of the rolling surface of the ball 5. The curved parts 18, 18 extend continuously from both ends of the spherical part 15 to the opening end of each pocket 7. The radius of curvature $R_{18}$ of the curved part 18 is larger than that of the spherical part 15 ($R_{18} > R_{15} > R_5$). The inner ends of the curved parts 18, 18 are smoothly continuous to the ends of the spherical part 15 as viewed in the widthwise direction. In other words, the tangential directions of the spherical part 15 at both ends are coincident with the tangential directions of the curved parts 18, 18 at the inner ends. The lengths of circular arc $L_{15}$ and $L_{18}$ of the spherical part 15 and the curved parts 18, 18 are determined in design. Those lengths are selected preferably to be within the following ranges defined by the following equations.

$$L_{15}=R_{15}\cdot\theta_{15}=2R_5\times(5 \text{ to } 15\%)$$

$$L_{18}=R_{18}\cdot\theta_{18}=2R_5\times(5 \text{ to } 15\%)$$

Figure 3:
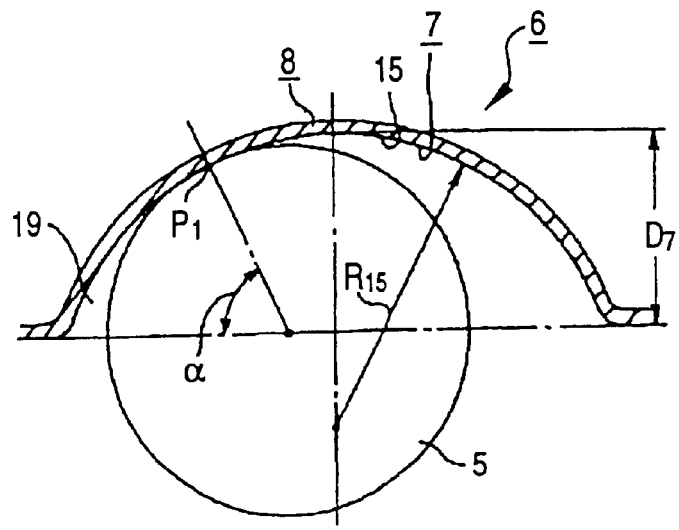
FIG. 3 is a cross sectional view taken on line D—D in FIG. 2.
Figure 23:
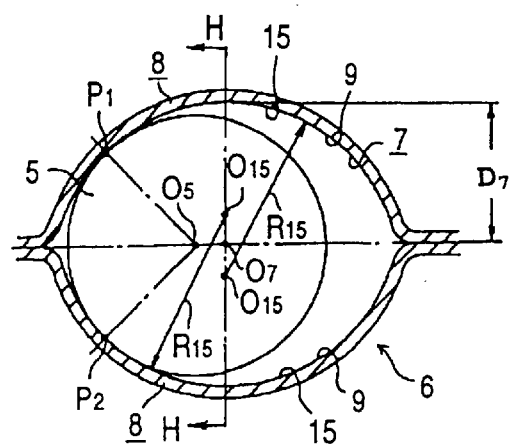
FIG. 23 is a cross sectional view taken on line G—G in FIG. 22.
Figure 24:
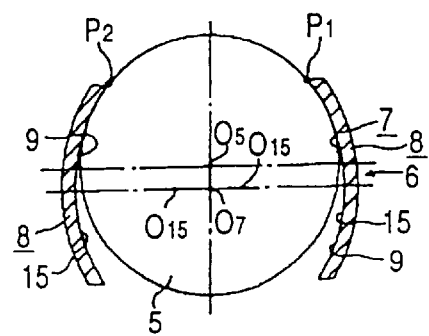
FIG. 24 is a cross sectional view taken on line H—H in FIG. 23; the cage is displaced to the inside diameter with respect to the ball.

Each pocket 7 is configured to have a shape like a rugby ball somewhat collapsed rather than a circular shape when viewed in the radial direction of the cage 6, as exaggeratedly shown in FIG. 3. As in the conventional structure shown in FIG. 23, the depth $D_7$ of the pocket 7 is smaller than the radius of curvature $R_{15}$ of the spherical part 15. Particularly, in the case of the invention, the difference between the depth $D_7$ and the radius of curvature $R_{15}$ ($R_{15}-D_7$) is selected to be larger than that in the conventional structure already stated. Accordingly, in this example, a point $P_1$ where the spherical part 15 forming each pocket 7 is in sliding contact with the rolling surface of the ball 5 is relatively greatly displaced from the middle part of the pocket 7 as widthwise viewed to the end of the pocket as widthwise viewed, as shown in FIG. 3. Specifically, a contact point angle α (=an angle at which a line interconnecting the center of the ball 5 and the point $P_1$ intersects a line representing the circumferential direction of the cage 6) is larger than that in the conventional structure shown in FIG. 23. The contact point angle α is selected to be larger than a contact angle (for example 100 to 20°) of the ball bearing incorporating the cage 6 (90° at the maximum). Accordingly, a relatively large clearance 19 is present between the rolling surface of the ball 5 and the inner peripheral surface of the pocket 7, as shown in FIG. 3.

In the cage 6 thus constructed, the inner peripheral surface of each pocket 7 rubs on the rolling surface of each ball 5 only on the spherical part 15, not on the curved parts 18, 18. Accordingly, a friction area between the inner peripheral surface of the pocket 7 and the rolling surface of the ball 5 reduces, and a frictional vibration generated at a sliding contact part between the cage 6 and each ball 5 diminishes. Accordingly, the vibration and the noise are lessened. Wedge clearances 17a, 17a are present between a couple of curved parts 18, 18, which are located on both sides of the spherical part 15, and the rolling surface of the ball 5, as shown in FIG. 2. Therefore, the lubricant which sticks to the rolling surface of the ball 5 during the operation of the ball bearing, is taken into a clearance ranging from the wedge clearances 17a, 17a to a region between the spherical part 15 and the rolling surface of the ball. The curved parts 18, 18 are provided on the inner diameter side and the outer diameter side of the pocket 7 and ranges through the full length of both openings of the pocket. The wedge clearances 17a, 17a also extend through the whole length of those openings. Accordingly, the lubricant is effectively taken into the clearance between the spherical part 15 and the rolling surface of the ball 5. With those operations, a friction acting on the sliding contact part between the cage 6 and the ball 5 is more lessened. A frictional vibration generated at the sliding contact part is lessened, and the vibration and noise are lessened.

A relatively large clearance 19, as shown in FIG. 3, is present between the rolling surface of the ball 5 and the inner peripheral surface of the pocket 7. The lubricant sticking to the rolling surface of the ball 5, particularly the rolling surface, is fed to the contact part between the rolling surface, and the inner raceway 1 and the outer raceway 3 (FIG. 1), while it is little scraped off. Accordingly, a sufficient amount of lubricant is fed to the contact part. This results in the improvement of the lubricating property of the ball bearing, and the durability of the ball bearing.

Figure 4:
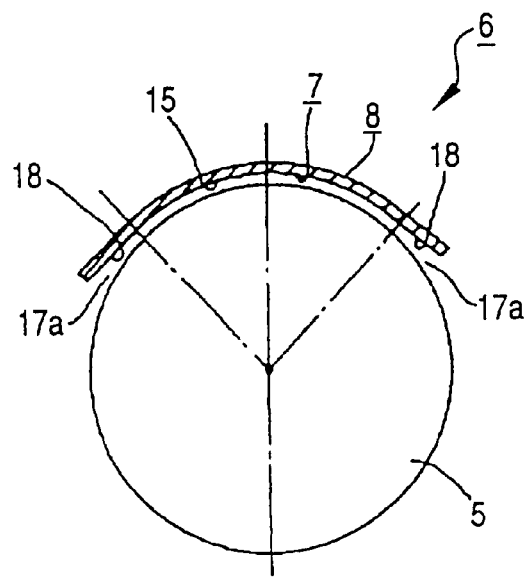
FIG. 4 is a cross sectional view showing another cage to be incorporated into the ball bearing of the invention.

The cage 6 may be modified such that the cross section of each of the curved parts 18, 18, which are provided at both sides of the spherical part 15 in order to form the inner peripheral surface of the pocket 7, is configured to be linear, as shown in FIG. 4. Specifically, the curved parts 18, 18 are configured as a conical concave surface, and the radius of curvature of its cross section configuration is infinite (∞). The construction and operation of the remaining portion are as in the above-mentioned embodiment.

In these rolling bearings, the radii of curvature of the cross-sectional shape of inner raceway 1 and outer raceway 3 are made equal to 51.0% to smaller than 60.0% of the diameter of ball 5. By restricting the dimensions in such a range, the reduction of bearing torque results from a synergetic effect of the torque-reducing effect exerted by the grease containing a thickener comprising a long fibrous material and a base oil comprising a polar group-containing lubricant and a non-polar lubricant, and the differential sliding reducing effect due to a small Hertian contact ellipse obtained by a reduced elastic deformation at the contact point of inner raceway 1 or outer raceway 3 with the rolling surface of ball 5. At the same time, fretting damages (abrasion) that might occur in inner raceway 1 and outer raceway 3 due to the impact load repetitively applied during transportation are effectively suppressed, leading to desirable acoustic durability. In contrast, in cases where the radii of curvature of the cross-sectional shape of inner raceway 1 and outer raceway 3 are made equal to 60.0% or more of the diameter of ball 5, the maximum Hertian contact pressure at the contact ellipse part becomes too large, and causes the rolling fatigue life of inner raceway 1 and outer raceway 3 to shorten, deteriorating the acoustic property and the flaking life.

A preferable range of the radii of curvature of the cross-sectional shape of inner raceway 1 and outer raceway 3 is from 51.5% to 58.0% of the diameter of ball 5. Furthermore, the radius of curvature of the cross-sectional shape of inner raceway 1 is preferably from 50.5% to 56.0% of the diameter of ball 5 while the radius of curvature of the cross-sectional shape of outer raceway 3 is preferably from 53.0% to 58.0% of the diameter of ball 5. Still further, by making the radius of curvature of the cross-sectional shape of outer raceway 3 larger than the radius of curvature of the cross-sectional shape of inner raceway 1, not only the contact surface pressure between the rolling surface of ball 5 and the inner raceway becomes small, but also preferably approaches to the contact surface pressure between the rolling surface of ball 5 and the outer raceway 3.

In particular, it is preferred to make the radius of curvature of the cross-sectional shape of inner raceway 1 equal to 51.0% to 56% of the diameter of ball 5, and also the radius of curvature of the cross-sectional shape of outer raceway 3 equal to 52.5% to 58.0% of the diameter of ball 5 whereby the reduction of bearing torque and fretting damages (abrasion) and the improvement of acoustic durability are further enhanced. Here again, it is desirable to make the radius of curvature of the cross-sectional shape of outer raceway 3 larger than the radius of curvature of the cross-sectional shape of inner raceway 1.

The ball bearing is packed with a grease composition to be described later, so that the smooth relative rotations of the inner ring 2 and the outer ring 4 is ensured, and neither vibration nor noise is generated. For this reason, sealing plates (not shown), such as annular sealing plates or shielding plates, are applied to the inner peripheral surfaces of the outer ring 4 at both ends, thereby preventing the leaking of the grease and preventing the entering of foreign matter, e.g., dust. Further, it is preferable to thinly coat the surfaces of the inner ring 2, outer ring 4, balls 5, and the cage 6 with a lubricant for the purpose of rust proofing of metallic part and elongating the life.

A base oil of a grease composition to be packed in the ball bearing constructed as described above is a mixed oil prepared by mixing a polar group-containing lubricant and a non-polar lubricant. A lubricant having an ester structure or an ether structure is preferable for the polar group-containing lubricant.

Preferable examples of the lubricant having an ester structure are not restricted in particular, but are an diester oil obtained by the reaction of dibasic acid with branched alcohol, carbonate ester oil, an aromatic ester oil obtained by the reaction of aromatic tribasic acid with branched alcohol, and polyol ester oil obtained by reacting monobasic acid with polyhydric alcohol. Those compounds may be employed either alone or as a mixture thereof. Preferable examples of such oils are specifically given below.

Examples of diester oils are dioctyl adipate (DOA), diisobutyl adipate (DIBA), dibutyl adipate (DBA), dibutyl sebacate (DBS), dioctyl sebacate (DOS) and methyl acetylricinoleate (MAR-N).

Examples of aromatic ester oils are trioctyl trimellitate (TOTM), tridecyl trimellitate (TDTM) and tetraoctyl pyromellitate (TOPM).

Examples of polyol ester oils are oils obtained by reacting polyhydric alcohol as given below with monobasic acid. Monobasic acid being reacted with polyhydric alcohol may be employed either single or as a mixture thereof. Complex esters which are oligo-esters between a polyhydric alcohol and a mixed acid of a dibasic acid and a monobasic acid may also be used for the polyol ester oils. Examples of polyhydric alcohols are trimethylolpropane (TMP), pentaerythritol (PE), dipentaerythritol (DPE), neopentyl glycol (NPG) and 2-methyl-2-propyl-1,3-propanediol (MPPD). Mono-valent fatty acids having 4 to 16 carbon atoms are mainly employed as the monobasic acids. Specific examples of those are butyric acid, valeric acid, caproic acid, caprylic acid, enanthic acid, pelargonic acid, capric acid, undecanoic acid, lauric acid, myristic acid, palmitic acid, beef tallow fatty acid, stearic acid, caproleic acid, palmitoleic acid, petroselinic acid, oleic acid, elaidic acid, asclepinic acid, vaccenic acid, sorbic acid, linoleic acid, linolenic acid, sabinic acid and ricinoleic acid.

An example of the carbonate ester oils is those having a straight chain or branched alkyl group having 6 to 30 carbon atoms.

Examples of the lubricant having the ether structure are (di)alkyl diphenyl ether oil, (di)alkyl polyphenyl ether oil, and polyalkylene glycol oil.

Each polar group-containing lubricants mentioned above may be employed either single or as a mixture thereof. Of those lubricants, polyol ester oils and aromatic ester oils are preferable when taking into account the torque characteristic and acoustic durability.

Mineral oils, synthetic hydrocarbon oils, or mixture oils of those oils may be employed as non-polar lubricants. Examples of the mineral oil are paraffinic mineral oil, naphthenic mineral oil and the like. An example of the synthetic hydrocarbon oil is an poly-α-olefin oil and the like. Of those examples, synthetic hydrocarbon oils are preferable when taking into account acoustic durability.

For the polar group-containing lubricant and the non-polar lubricant, the polar group-containing lubricant is con-
tained in an amount of preferably 5% by mass to 70% by mass, particularly 10% by mass to 70% by mass, based on the total amount of the base oil. When the blended amount of the polar group-containing lubricants is less than 5% by mass, the acoustic durability improvement and the torque reduction effects are insufficient. The grease composition used for the ball bearing of the present invention is prepared in a manner that a metallic soap-based thickener containing long fibrous material is synthesized in the non-polar lubricant and then dissolved therein, then a gel is formed, and the gel and the polar group-containing lubricant are mixed. Accordingly, when the blended amount of the polar group-containing lubricant exceeds 70% by mass, the amount of the non-polar lubricant is too small, and this adversely affects the synthesizing of the metallic soap-based thickener containing long fibrous material.

Although the kinematic viscosity of the base oil comprising a polar group-containing lubricant and a non-polar lubricant may be in the conventionally known range of from 10 mm$^2$/s (at 40° C.) to 500 mm$^2$/s (at 40° C.), the base oil preferably contains a high-viscosity polar group-containing lubricant with a viscosity of 2,000 mm$^2$/s (at 40° C.) to 100,000 mm$^2$/s (at 40° C.) as the polar group-containing lubricant. To improve fretting characteristics, the base oil having the higher kinematic viscosity is preferred, since the torque can be reduced due to the presence of the long fibrous material as a thickener. Specifically, the kinematic viscosity of the base oil preferably is in the range of from 25 mm$^2$/s (at 40° C.) to 500 mm$^2$/s (at 40° C.), particularly from 50 mm$^2$/s (at 40° C.) to 500 mm$^2$/s (at 40° C.).

Further, the combination of a low-viscosity polar group-containing lubricant having a kinematic viscosity at 40° C. of from 10 mm$^2$/s to smaller than 150 mm$^2$/s, a medium-viscosity polar group-containing lubricant having a kinematic viscosity at 40° C. of from 150 mm$^2$/s to smaller than 2,000 mm$^2$/s, and a high-viscosity polar group-containing lubricant having a kinematic viscosity at 40° C. of from 2,000 to 100,000 mm$^2$/s in appropriate mixing ratios are preferred. In particular, it is preferred to use the mixture of three kinds of polar group-containing lubricants, i.e., a low-viscosity polar group-containing lubricant, a medium-viscosity polar group-containing lubricant and a high-viscosity polar group-containing lubricant whereby the content of the high-viscosity polar group-containing lubricant is preferably from 5 to 30% by mass of the total amount of the base oil. Here, the low-viscosity polar group-containing lubricant is preferably selected from polyol ester oils, diester oils and ether oils.

A thickener of the grease composition used in the ball bearing of the present invention is a metallic soap-based thickener containing long fibrous materials whose fiber length is 3 μm or longer. Examples of the preferable metallic soap are an organic fatty acid metal salt or an organic hydroxy fatty acid metal salt, which is obtained by synthesizing monovalent and/or divalent organic fatty acid or organic hydroxy fatty acid with metal hydroxide. The organic fatty acid used for the synthesizing of the metallic soap are not limited to a specific one or ones. Examples of those organic fatty acids are lauric acid ($C_{12}$), myristic acid ($C_{14}$), palmitic acid ($C_{16}$), margaric acid ($C_{17}$), stearic acid ($C_{18}$), arachidic acid ($C_{20}$), behenic acid ($C_{22}$), lignoceric acid ($C_{24}$), and beef tallow fatty acid. Examples of the organic hydroxy fatty acid are 9-hydroxystearic acid, 10-hydroxystearic acid, 12-hydroxystearic acid, 9,10-dihydroxystearic acid, ricinoleic acid, and ricinelaidic acid. Examples of the metal hydroxide are hydroxides of aluminum, barium, calcium, lithium, sodium and the like.

There is no special limitation on the combination of the organic fatty acid or organic hydroxy fatty acid and the metal hydroxide. However, a combination of stearic acid, beef tallow fatty acid or hydroxystearic acid (in particular, 12-hydroxystearic acid) and lithium hydroxide is preferable since the combination produces excellent bearing performances. If required, plural combinations of compounds may be employed instead.

In order to obtain the grease composition containing metallic soap-based thickener containing long fibrous materials, the organic fatty acid or organic hydroxy fatty acid and metal hydroxide are reacted in a non-polar lubricant as a base oil component, and the product is blended with a polar group-containing lubricant. While no special limitation is put on the grease composition preparing conditions, one example of such is described below by way of example.

To start with, a hydroxystearic acid is dissolved in an synthetic hydrocarbon oil (non-polar lubricant), and it is reacted with lithium hydroxide to form a lithium soap. The lithium soap is heated to a temperature of 210° C. or higher, and dissolved into a polar group-containing lubricant. The resultant is kept at a temperature of 200° C. for about 60 minutes, and then is cooled to 140° C. at a cooling rate of 1° C./min. When the temperature reaches 140° C. or lower, another base oil (i.e., synthetic hydrocarbon oil+the polar group-containing lubricant) heated to 140° C. is added. Thereafter, the mixture was passed through a three-roll mill to produce the grease composition containing lithium soap containing long fibrous materials.

The amount of the thickener may be 5 to 20% by mass of the total amount of the grease composition as of the conventional grease composition. A blending amount of organic fatty acid or hydroxy fatty acid and, metal hydroxide may appropriately be selected.

The grease composition contains metallic soap-based thickener containing long fibrous materials. The blending amount of the thickener is preferably at least 30% by mass based on the total thickener amount. If the blending amount is less than 30% by mass, the bearing torque is insufficiently reduced. When the fiber length of the metallic soap-based thickener containing long fibrous materials is too long, a vibration that is generated when the thickener enters the contact surface of the ball bearing during its rotation, becomes large. In particular, the initial acoustic characteristic is adversely affected. Therefore, the upper limit value of the fiber length is selected to preferably be 10 $\mu$m. While no limitation is placed on the fiber diameter, it is selected to be less than 1 $\mu$m. The dimensions of fiber length and fiber diameter of metallic soap-based thickener containing long fibrous materials may be controlled by appropriately selecting the reaction condition described above.

Figure 9B:
FIG. 9B is an electron photomicrograph of a grease composition prepared in Comparative Example 5.
Figure 9A:
FIG. 9A is an electron photomicrograph of a grease composition prepared in Example 1.

In the grease composition synthesized, to measure the dimensions of fiber length and the fiber diameter of the metallic soap-based thickener, for example, the grease composition is dispersed and diluted in a solvent, such as hexane, and is deposited on a copper mesh coated with a collodion film, and those dimensions may be measured while observing them by use of a transmission electron microscope at a magnification on the order of 6,000 to 20,000 times. FIG. 9A is an example of a photomicrograph (of a grease composition in Example 1). In the photomicrograph, it is observed that long fibrous materials of 3 $\mu$m or longer in fiber length are generated.

It is preferable to add carboxylic acid or carboxylate other than the base oil and the thickener to the grease composition. With the addition of carboxylic acid or carboxylate, adsorption film is formed to ameliorate surface friction characteristics and to make the bearing torque reduction effective. This lead to amelioration of the acoustic durability. Examples of carboxylic acids are oleic acid, naphthenic acid and succinic acid. The alkenylsuccinic acid is preferably succinic acid compound. Examples of succinic acid derivatives are alkylsuccinic acid ester, alkylsuccinic acid ether, alkenylsuccinic acid ester and alkenylsuccinic acid ether. The total amount of the additives is 10% by mass or less based on the total amount of the grease composition.

The grease composition may be added with a single or a combination of two or more number of the following materials so long as the desirable characteristics of the grease composition are not impaired: anti-oxidant, rust preventive, metal deactivator, oiliness agent, extreme pressure agent, wear inhibitor and viscosity index improver. Those additives may be known materials. Examples of the anti-oxidant are amino compounds, phenolic compounds, sulfur compounds and zinc dithiophosphate. Examples of the rust preventive are petroleum sulfonate, dinonylnaphthalene sulfonate and sorbitan ester. Examples of the metal deactivator are benzotriazole and sodium zincate. Examples of the oiliness agent are fatty acid and vegetable oil. Examples of the viscosity index improver are polymethacrylate, polyisobutylene and polystyrene. Those additives may be added either single or as a combination of two or more additives thereof. The total amount of the additives is 20% by mass or less based on the total amount of the grease composition.

The worked penetration of the grease composition is preferably 250 to 330.

(Ball Bearing of the Above-Described Second Aspect)

The ball bearing of the above-described second aspect of the present invention is characterized in that the ball bearing contains a cage having the same structure as in the above-described first aspect of the present invention and that the radius of curvature of the cross-sectional shape of the inner raceway is 51.5% to 56.0% of the diameter of the ball 5 and the radius of curvature of the cross-sectional shape of the outer raceway is 52.5% to smaller than 58.0% of the diameter of the ball. The radius of curvature of the cross-sectional shape of the inner raceway is preferably 51.5% to 54.0% of the diameter of the ball 5 and the radius of curvature of the cross-sectional shape of the outer raceway is preferably 52.5% to 56.0% of the diameter of the ball.

In the ball bearing of the above-described second aspect of the present invention as constituted as described above, a grease is packed for lubrication. There is no special limitation on the grease and various kinds of known greases can be used. The grease composition can be used which contains a metallic soap-based thickener containing a long fibrous material whose fiber length is at least 3 $\mu$m, which grease composition is similar to the grease packed in the ball bearing of the above-described first aspect of the present invention. However, in such a case, the amount of the long fibrous material contained is smaller than 30% by mass. Furthermore, in the grease composition, there is no special limitation on the base oil, and mineral oils and various synthetic oils can be used as the base oil. However, taking torque, anti-fretting characteristics and the like into consideration, the base oil having the kinematic viscosity of from 25 mm$^2$/s (at 40° C.) to 150 mm$^2$/s (at 40° C.), particularly from 50 mm$^2$/s (at 40° C.) to 100 mm$^2$/s (at 40° C.) is preferred.

In the grease composition packed in the ball bearing of the above-described second aspect of the present invention, the same additives as those for grease packed in the ball bearing of the above-described first aspect of the present invention may be added. The worked penetration of the grease composition is preferably 250 to 330, which is the same as in the grease composition packed in the ball bearing of the above-described first aspect of the present invention. (Ball bearing of the above-described third aspect) The ball bearing of the third aspect of the present invention is constituted by incorporating a crown-type cage 50 having pockets with specific shape as shown in each of FIGS. 5 to 8 for the ball bearing of the first aspect of the invention.

Figure 5:
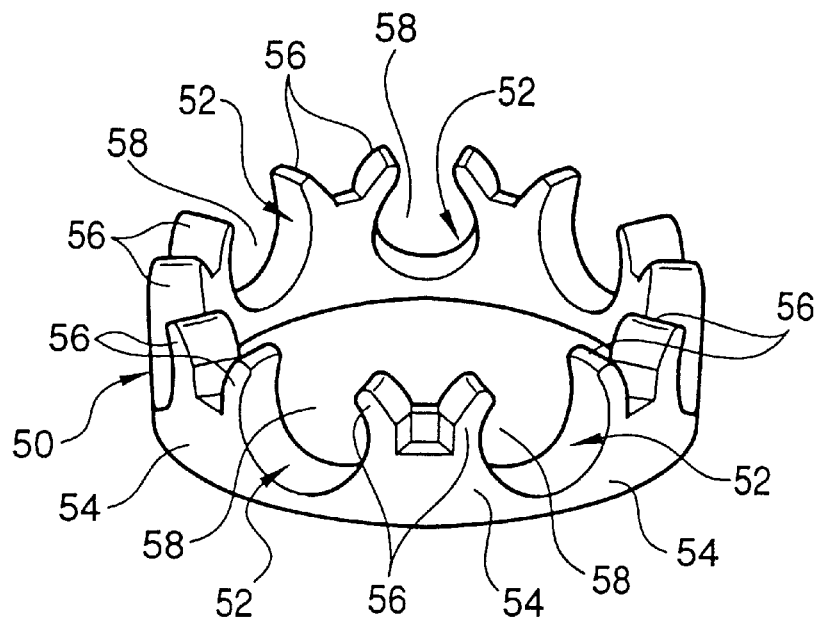
FIG. 5 is a perspective view showing a crown-type cage incorporated into a ball bearing of the third or fourth aspect of the invention.
Figure 6:
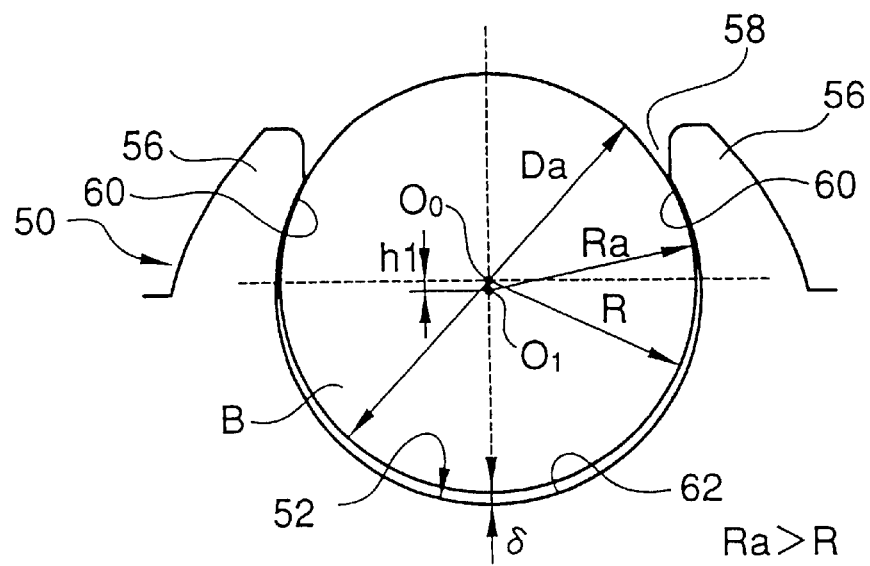
FIG. 6 is a partially enlarged view for explaining a pocket shape of the crown-type cage shown in FIG. 5.

The crown-type cage 50, as shown in the perspective view of FIG. 5, is a circular ring shape as a whole. The cage 50 comprises a base part 54 and pockets 58 for holding balls (not shown) with a claw 56 and a pocket surface 52 at plural places in the circumferential direction of the base part 54. An opening defined between the claws 56 has width that is smaller than the diameter of each ball, and the opening is disposed on one side of the axial direction of each pocket 58. FIG. 6 shows an enlarged view of the pocket part wherein a ratio of an axial clearance 6 provided between a rolling surface of a ball B in the axial direction and a pocket surface 52 to the diameter Da of each ball B are set so as to satisfy the relation of "δ/Da=−0.01 to 0.02".

When the value of δ/Da exceeds 0.02, where a crown-type cage 50 is going to move in the axial direction relative to a ball B, there is a fear that the axial clearance δ is increasing excessively to cause the ball B to be collided with a first pocket surface 60 in the inside of an opening or with a second pocket surface 62 at the bottom of a pocket 58 with a large force to thereby increase the noise level. On the other hand, when the value of δ/Da becomes smaller than −0.01, an axial clearance δ between a rolling surface of a ball B and a pocket surface 52 decreases excessively, thereby raising a fear that a dynamic torque may suddenly be increased.

Figure 7:
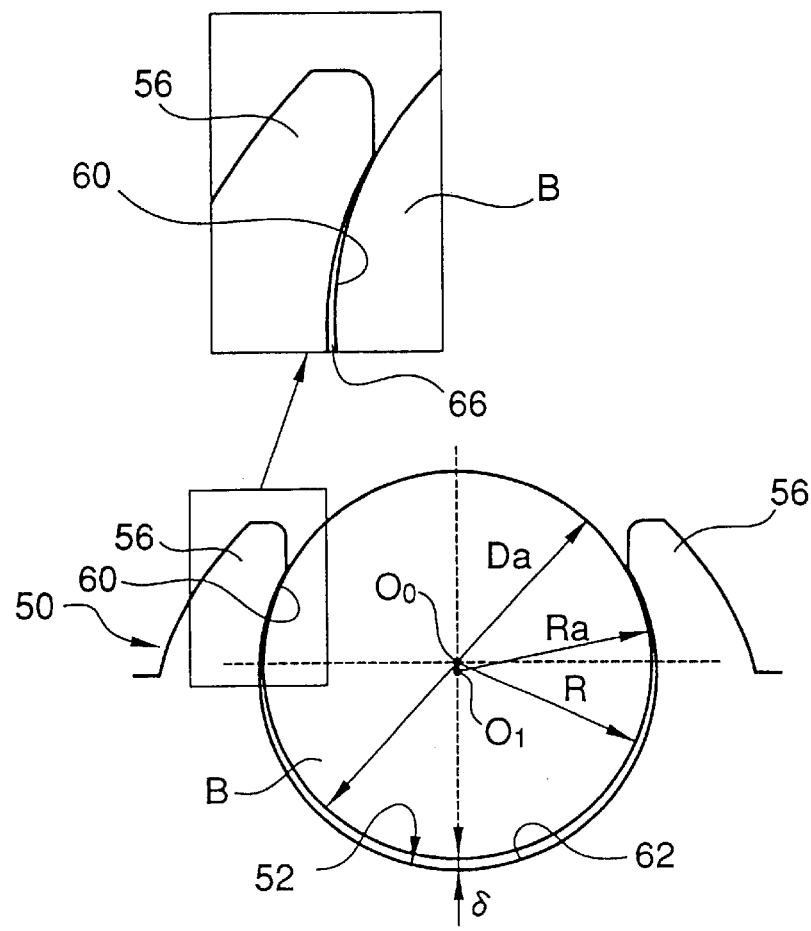
FIG. 7 is a partially enlarged view for showing a state under which a ball is received in the crown-type cage shown in FIG. 6.

On the other hand, when the value of δ/Da is set within the range of from −0.01 to 0.02, the movement of a crown-type cage in the axial direction is restricted by a first pocket surface 60 in the inside of an opening and a second pocket surface 62 at the bottom of the opening, to thereby reduce the collision force between the ball B and the pocket surface 52. Furthermore, because the sufficient lubricant reservoir can be obtained, the increase in the dynamic torque and the noise level can be inhibited. Further, when the pocket surface 52 is constituted by a pair of first pocket surfaces 60 provided inside an opening and a second pocket surface 62 provided between the first pocket surfaces 60, wherein a center $O_1$ of radius of curvature Ra of the first pocket surface 60 is shifted by $h_1$ in the axial direction or by $h_2$ in a circumferential direction from a center $O_0$ of radius of curvature R of the second pocket surface 62 which is almost coincised with a rolling center of the ball B, in case where the ball is brought in contact with an inner wall of the opening, as shown in FIG. 7, because relatively large lubricant reservoir 66 is formed in the circumferential direction between the ball B and the first pocket surface 60, the increase in the dynamic torque and the noise level can be inhibited and the lubricant can be easily introduced and retained inside the pocket.

Specifically, when the radius of curvature Ra of the first pocket surface 60 is set so as to have the value larger than the radius of curvature R of the second pocket surface 62, the center $O_1$ of radius of curvature Ra of the first pocket surface 60 is shifted by $h_1$ in the axial direction so as to be separated from the center $O_0$ of radius of curvature R of the second pocket surface 62 in the direction opposite to the opening, and the height at the inflection point of the first pocket surface 60 is set to be coincided with that of the second pocket surface 62, a relatively large lubricant reservoir 66 is formed in the circumferential direction.

Figure 8:
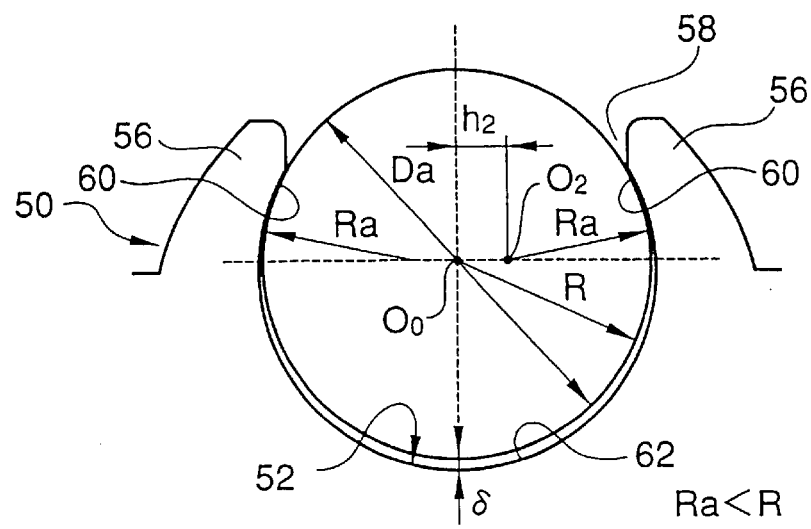
FIG. 8 is a partially enlarged view for explaining another example of the pocket shape of the crown-type cage shown in FIG. 5.

As shown in FIG. 8, when the radius of curvature Ra of the first pocket surface 60 is set so as to have the value smaller than the radius of curvature R of the second pocket surface 62, a center $O_2$ of radius of curvature Ra of the first pocket surface 60 is shifted by $h_2$ in the circumferential direction to a center $O_0$ of radius of curvature R of the second pocket surface 62, and the height in the inflection point of the first pocket surface 60 is set to be coincided with that of the second pocket surface 62, the holding manner of the ball B by the pocket surface at the opening side can be freely set.

Furthermore, although a figure is omitted, there can be made such a constitution that the radius of curvature Ra of the first pocket surface 60 is set so as to have the same value as the radius of curvature of the second pocket surface 62, a center of radius of curvature Ra of the first pocket surface 60 is shifted in the axial direction so as to be separated from the center of radius of curvature R of the second pocket surface 62 in the direction opposite to the opening, and the height in the inflection point of the first pocket surface 60 is set to be coincided with that of the second pocket surface 62.

Furthermore, it is preferred that the design of such a pocket shape is made for as many pockets 58 as possible. However, when the bearing comprises internal clearance in the bearing itself, and is used at least under the application of an axial load, because the contact surface is stabilized by three contact points at the minimum, at least three of the pockets 58 need be designed as described above.

The same grease composition as that for the ball bearing of the first aspect of the present invention is packed in the ball bearing in which the crown-type cage is introduced to complete a ball bearing of the third aspect of the present invention. In the ball bearing, the noise, vibration, fretting damage (abrasion) and torque of the cage are reduced, and the acoustic durability of the cage is improved, as is the case with the ball bearing of the first aspect of the present invention.

(Ball Bearing of the Above-Described Fourth Aspect)

The ball bearing of the fourth aspect of the present invention is constituted by incorporating the crown-type cage 50 shown in the ball bearing of the third aspect of the present invention into the ball bearing of the second aspect of the present invention. In the ball bearing of the fourth aspect of the present invention, the noise, vibration, fretting damage (abrasion) and torque of the cage are reduced, and the acoustic durability of the cage is improved, as is the case with the ball bearing of the second aspect of the present invention.

The ball bearings of the above-described first to fourth aspects of the present invention thus constructed each exhibits a particularly excellent low torque, acoustic characteristic and anti-fretting property when it has an internal clearance in the bearing itself. In general, the differential sliding caused by the radial difference of each contact ellipse between the inner raceway or the outer raceway and the ball, and the spin sliding occurring in the state where there exists a contact angle under the application of an axial load affects the torque and acoustic characteristics of the ball bearing. The torque increase due to the spin sliding inevitably takes place when a ball bearing having an internal clearance therein operates subjecting to a pre-loading in the axial direction or an external axial loading with the presence of a contact angle. Accordingly, the invention is particularly effective when applied to a ball bearing having an internal clearance therein and a contact angle at least under the application of an axial load is an angle other than 0°.

Further description of the invention will be given by using Examples and Comparative Examples. It will be understood that the invention is not limited to Examples to be described hereunder.

EXAMPLES 1 TO 11, COMPARATIVE EXAMPLES 1 to 5

Grease compositions and their properties in Examples 1 to 11 and Comparative Examples 1 to 5 are shown in Tables 1 to 3. The sum total amount of a grease composition was 1000 g: the total amount of a lithium soap and a base oil was 950 g, and 50 g of additives (carboxylic acid, anti-oxidant, rust preventive, metal deactivator, etc.) was added to the lithium soap and the base oil. A kinematic viscosity (at 40° C.) and a worked penetration of the base oil are also described in the table. A method of preparing a grease composition follows. A hydroxystearic acid was dissolved into each non-polar lubricant. The resultant was reacted with lithium hydroxide to form a lithium soap. The resultant was heated to 210° C. or higher and dissolved into each polar group-containing lubricant, and then kept at 200° C. for about 60 minutes. Thereafter, it was cooled to 140° C. at a cooling rate of 1° C./min. When the temperature decreases to below 140° C., another base oil (synthetic hydrocarbon oil+polar group-containing lubricant) heated to 140° C. was added thereto. Thereafter, the mixture was treated with a three-roll mill to produce the grease composition.

Grease compositions prepared by Example 1 and Comparative Example 5 each was dispersed into hexane, and diluted therein. The grease composition was deposited on a copper mesh coated with a collodion film. The resultant grease compositions were observed at a magnification of 6,000 by use of a transmission electron microscope. An electron photomicrograph of the grease composition prepared in Example 1 is shown in FIG. 9A, and an electron photomicrograph of the grease composition prepared in Comparative Example 5 is shown in FIG. 9B. As can be seen from the photomicrographs, a lithium soap of at least 3 $\mu$m in fiber length is contained in grease composition prepared in Example 1.

The grease compositions thus prepared were packed in test bearings. The test bearings were subjected to (1) bearing dynamic torque test, (2) bearing cage noise measurement, (3) fretting test and (4) bearing acoustic durability test. A wave press cage containing the spherical part and the curved part shown in FIG. 2 was used in Examples 1 to 11. A conventional wave press cage shown in FIG. 20 was used in Comparative Examples 1 to 5.

The ratio of the radius of curvature of the cross-sectional shape of the inner raceway or the outer raceway in the bearing to be tested to the ball diameter (this ratio being called Groove R hereinafter) is as follow.

Example 1: Groove R for an inner raceway=51.75%, Groove R for an outer raceway=53.0%

Example 2: Groove R for an inner raceway=51.5%, Groove R for an outer raceway=52.5%

Example 3: Groove R for an inner raceway=52.5%, Groove R for an outer raceway=54.5%

Example 4: Groove R for an inner raceway=53.0%, Groove R for an outer raceway=55.0%

Example 5: Groove R for an inner raceway=56.0%, Groove R for an outer raceway=58.0%

Example 6: Groove R for an inner raceway=51.0%, Groove R for an outer raceway=51.0%

Example 7: Groove R for an inner raceway=59.0%, Groove R for an outer raceway=59.75%

Examples 8 to 11 (which are the same as one another): Groove R for an inner raceway=51.5%, Groove R for an outer raceway=53.0%

Comparative Examples 1 to 5 (which are the same as one another): Groove R for an inner raceway=52.0%, Groove R for an outer raceway=52.0%

(1) Bearing Dynamic Torque Test

Figure 10:
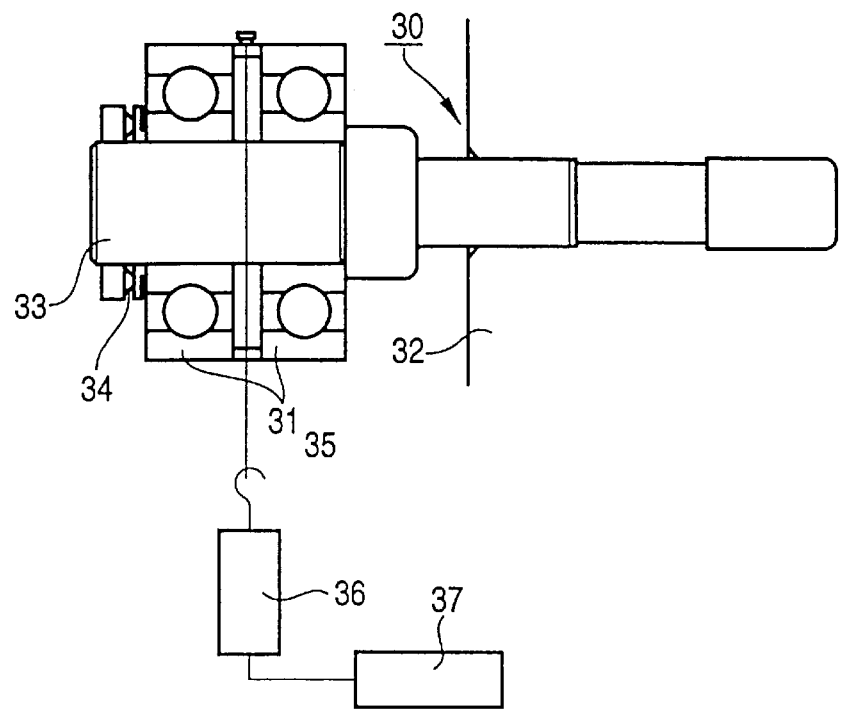
FIG. 10 is a diagram schematically showing a measuring apparatus used for bearing torque tests in Examples.

A measuring apparatus for torque test 30 shown in FIG. 10 was used for measuring bearing dynamic torques of the test bearings. A couple of test bearings 31 are set to a shaft 33 coupled to a drive spindle 32 by means of a pre-loading wave washer 34 in the measuring apparatus for torque test 30. The test bearing 31, together with the drive spindle 32, is placed horizontally. A load converter 36 is suspended on a string 35. An output signal of a load converter 36 is recorded by an X-Y recorder 37.

In the test, test bearings 31 were ball bearings with non-contact rubber seals, which each contains a wave press cage as mentioned above. The dimensions of the ball bearing were; inside diameter: 15 mm$\phi$; outside diameter: 35 mm$\phi$; width: 11 m. The test bearings 31 are packed with grease compositions each of 7 g prepared in Examples 1 to 11 and Comparative Examples 1 to 5. An axial load was 39.2N, and the inner ring was rotated at 1,400 min$^{-1}$. Under the conditions, dynamic torques of the ball bearings were measured. The results of the dynamic torque measurement are shown in Tables 1 to 3. In Tables 1 to 3, "×" indicates that a dynamic torque of the test bearing 31 is 80% or larger when the dynamic torque of the ball bearing, which is packed with a grease composition used for a conventional air conditioner fan motor, is 100% (reference value). "Δ" indicates that a dynamic torque of the test bearing 31 was within a range from 60% to less than 80% of the reference value. "○" indicates that it was within a range from 40% to less than 60% of the reference value. "⊚" indicates that it was less than 40%. In the bearing dynamic torque test, the test bearings capable of exhibiting the dynamic torque values within those of the "○" case, that is, less than 60% of the reference value, were acceptable. From Tables 1 to 3, it is seen that in Examples 1 to 11, the test bearings exhibit good torque characteristics.

Using bearings having groove R for a conventional inner raceway=52.0% and groove R for a conventional outer raceway=52.0%, a blending ratio of the polar group-containing lubricant in the grease composition, a kinematic viscosity of the base oil, and a blending ratio of long fibrous material of the thickener were verified through the bearing dynamic torque measurement.

(1-1 Verification of a Blending Ratio of the Polar Group-Containing Lubricant)

Figure 11:
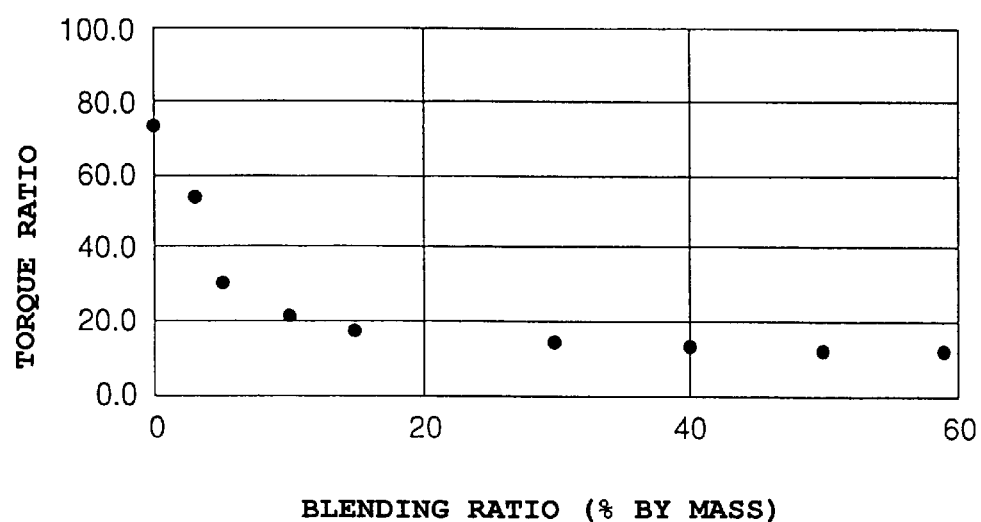
FIG. 11 is a graph showing a relation between a bearing torque and a blending ratio of a polar group-containing lubricant, obtained in Example.

A grease composition was prepared by varying the blending ratio of polyol ester in accordance with Example 2, and a test bearing packed with the resultant grease composition was measured about its dynamic torque. The measurement was conducted five minutes after the bearing rotation started. From FIG. 11 showing the measurement result, it is seen that if the polyol ester is contained in an amount of 5% by mass or more, particularly 10% by mass or more, the torque characteristic obtained is extremely excellent.

(1-2 Verification of a Kinematic Viscosity of the Base Oil)

Figure 12:
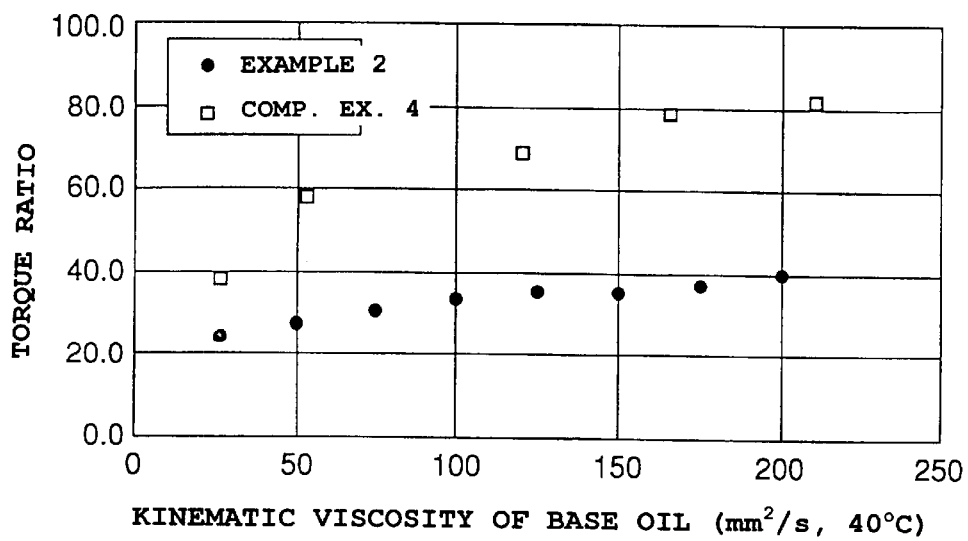
FIG. 12 is a graph showing a relation between a bearing torque and a kinematic viscosity of the base oil, obtained in Example.

A grease composition was prepared by varying the kinematic viscosity of the base oil in accordance with Example 2 and Comparative Example 4, and a test bearing packed with the resultant grease composition was measured about its dynamic torque. The measurement was conducted five minutes after the bearing rotation started. From FIG. 12 showing the measurement result, it is seen that in the test bearing packed with the grease composition in Example 2, the bearing dynamic torque is extremely low over the entire range of kinematic viscosity values (25 to 200 mm$^2$/s, 40° C.) of the base oil as set, and the torque characteristic obtained is extremely excellent.

In particular, with kinematic viscosities of 50 mm$^2$/s at 40° C., the difference of Example 2 from Comparative Example 4 becomes remarkable.

(1-3 Verification of the Blending Ratio of the Long Fibrous Material in the Thickener)

Figure 13:
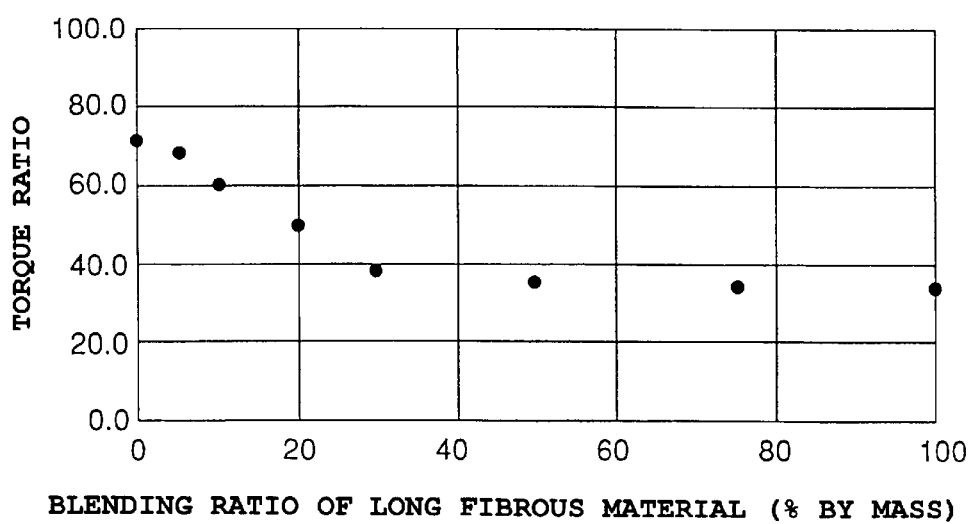
FIG. 13 is a graph showing a relation between a bearing torque and a blending ratio of the long fibrous material of the thickener, obtained in Example.

A grease composition was prepared by varying the blending ratio of a long fibrous material in a lithium soap in accordance with Example 2, and a test bearing packed with the resultant grease composition was measured about its dynamic torque. The measurement was conducted five minutes after the bearing rotation started. From FIG. 13 showing the measurement result, it is seen that if the long fibrous material is contained in an amount of at least 30% by mass, the bearing torque is held to be low.

(1-4 Verification of the Effect of the Radius of Curvature of the Cross-Sectional Shape of the Inner Raceway)

Figure 14:
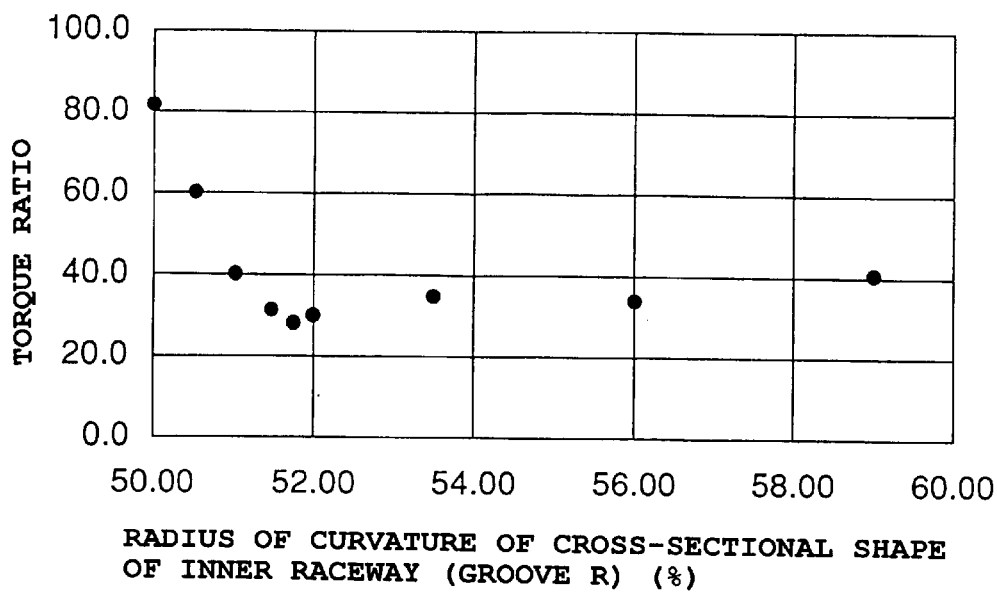
FIG. 14 is a graph showing the relation between the ratio of the radius of curvature of the cross-sectional shape of the inner raceway to the ball diameter and torque ratio, obtained by the Examples.

With a bearing to be tested in which the radius of curvature of the cross-sectional shape of the outer raceway is fixed to 53.0% of the ball diameter with varying radius of curvature of the cross-sectional shape of the inner raceway and in which the grease composition of Example 2 is packed, similar measurements of bearing dynamic torque were conducted. The torque was measured five minutes after the start of rotation. The results are shown in FIG. 14, which indicates that, when the radius of curvature of the cross-sectional shape of the inner raceway is 51.0% or more of the ball diameter, the bearing dynamic torque can be suppressed to a sufficiently low value. Particularly preferable radii of curvature are between 51.5 and 58.0% where the torque ratio is less than 40%.

In FIG. 14, when the radius of curvature of the cross-sectional shape of the inner raceway is 50.5% of the ball diameter, the torque ratio is slightly smaller than 60% of the reference as "O". That is, the radius of curvature of the cross-sectional shape of the outer raceway is 53.0% of the ball diameter. This fact resulted from effective suppression of dynamic torque by the combination of the radius of curvature of the cross-sectional shape of the inner raceway and the radius of curvature of the cross-sectional shape of the outer raceway. In other words, even when the radius of curvature of the cross-sectional shape of the inner raceway and the radius of curvature of the cross-sectional shape of the outer raceway fall outside the range of 51.0% to smaller than 60% of the ball diameter, a desirable low torque is achieved with a radius of curvature of the cross-sectional shape of the inner raceway not smaller than 50.5% of the ball diameter combined with a radius of curvature of the cross-sectional shape of the outer raceway not smaller than 53.0% of the ball diameter. Bearing torque is affected by the contact areas between the inner ring and the ball and between the outer ring and the ball, and the slip during the contact. Usually, bearing torque tends to increase with smaller radius of curvature of the cross-sectional shape of the inner raceway and smaller radius of curvature of the cross-sectional shape of the outer raceway since the contact area with the ball increases. The invention can decrease bearing torque by making the radius of curvature of the cross-sectional shape of the inner raceway or the radius of curvature of the cross-sectional shape of the outer raceway larger.

(2) Bearing Cage Noise Measurement

In the test, test bearings 31 were ball bearings with non-contact rubber seals, which each contains a wave press cage as mentioned above. The dimensions of the ball bearing were; inside diameter: 15 mm$\phi$; outside diameter: 35 mm$\phi$; width: 11 mm. The test bearings 31 are packed with grease compositions each of 7 g prepared in Examples 1 to 11 and Comparative Examples 1 to 5. An axial load was 39.2N, and the inner ring was rotated at 1,800 $\text{min}^{-1}$. Under the conditions, the cage noise of the ball bearings were measured at 0° C. and +20° C. by using a frequency analyzer. The measurement results of the cage noise are shown in Tables 1 to 3. In Tables 1 to 3, "○" indicates that no cage noise is generated; "Δ" indicates that small cage noise is generated; and "×" indicates that large cage noise is generated. From Tables 1 to 3, it is seen that no cage noise is generated in Examples 1 to 11.

(3) Fretting Test

Figure 15:
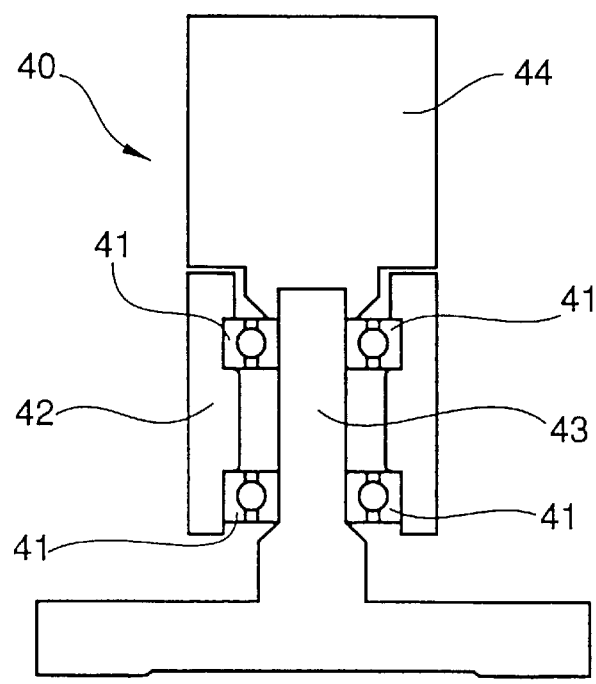
FIG. 15 is a conceptual view of schematically illustrating the measuring apparatus used for the fretting test in the Examples.

Fretting tests were made with a measuring apparatus 40 shown in FIG. 15. In measuring apparatus 40, the bearing to be tested 41 is equipped via an outer ring housing 42 and a shaft 43. With use of a vibrator 44, repeated loads were applied to bearing to be tested 41 at the frequency of 50 Hz. The test was conducted with a ball bearing equipped with a non-contact rubber seal, the bearing having an iron cage and the inside and outside diameters thereof being 15 mm$\phi$ and 35 mm$\phi$, the width thereof being 11 mm and the internal clearance being 11 to 25 $\mu$m as a bearing to be tested 41, and by packing 0.7 g of each grease composition of Examples 1 to 11 and Comparative Examples 1 to 5 to the rolling bearing. With axial loads varied from 20 to 1,500N, $5 \times 10^5$ cycles were applied as a fretting test. With the following evaluation criteria, the acoustic characteristics of bearing to be tested 41 after the fretting test were measured.

The acoustic characteristics of the bearing were evaluated with an Anderon meter in terms of the increment of Anderon value obtained by the comparison of the bearing Anderon value immediately after the packing of each grease composition with that after the fretting test of the $5 \times 10^5$ cycle applications. In addition, each bearing subjected to the fretting test was decomposed to observe the abrasion damage state of the bearing raceway surface. Bearings having abrasion damage clearly visible exhibited marked deterioration in acoustic characteristics (large increase in Anderon value), while those having no abrasion damage exhibited no deterioration in acoustic characteristics (no increase in Anderon value). These facts confirm that there is a strong correlation between the abrasion damage state of the bearing raceway surface and the acoustic characteristics.

The results are shown in Tables 1 to 3 as fretting (acoustic characteristics). In Tables 1 to 3, "×" indicates that the acoustic characteristics of test bearing 41 is 75% or higher relative to the reference value (100%) that corresponds to the acoustic characteristics (increase in Anderon value) of a test bearing packed with a grease composition used in conventional motors for air-conditioners. On the same basis, "Δ" indicates 50% to smaller than 75%, "O" 25% to smaller than 50%, and "⊙" smaller than 25% of the reference value, respectively. As for the fretting test, the levels of "O", i.e., those of smaller than 50% of the reference value, were judged acceptable. It is evident from Tables 1 to 3 that desirable fretting characteristics can be achieved with the bearings packed with the grease compositions used in Examples 1 to 11.

(4) Bearing Acoustic Durability Test

Figure 16:
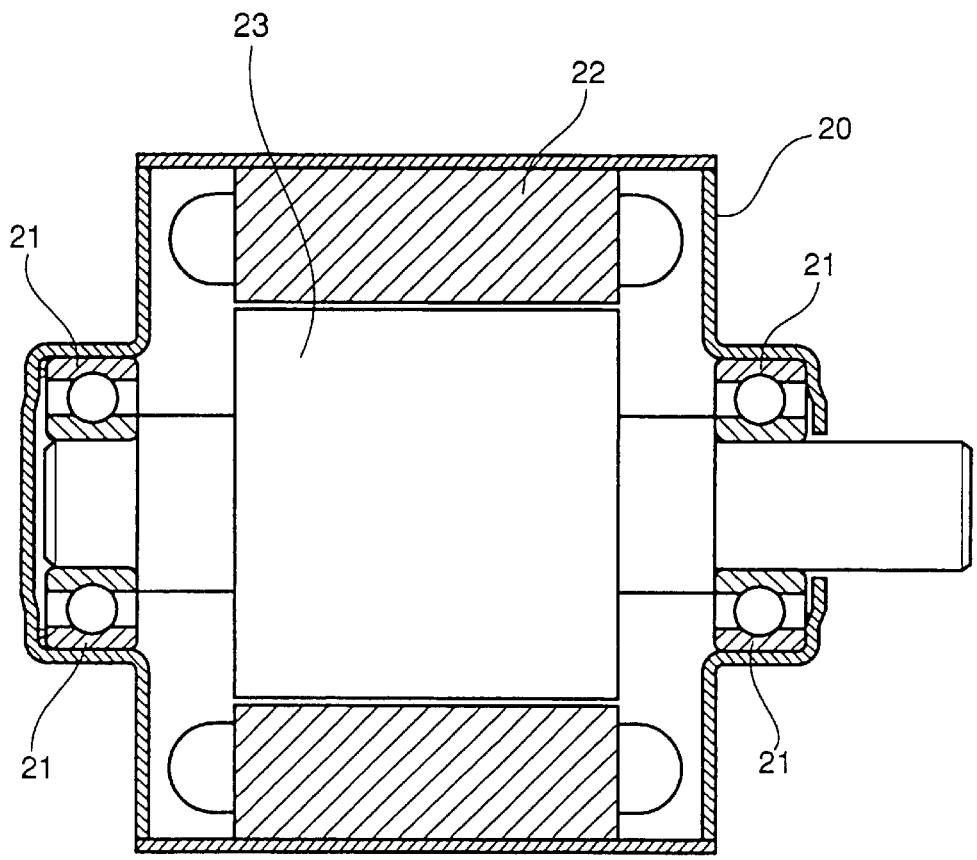
FIG. 16 is a cross sectional view showing a measuring apparatus used for a bearing acoustic durability test in Example.

The bearing acoustic durability was conducted by use of an actual motor durability testing apparatus shown in FIG. 16. The actual motor durability testing apparatus is constructed such that a couple of test bearings 21 installed in a housing 20 and coupled to a rotor 23 are rotated by a power of a DC power source through a coil (stator). In the test, test bearings 21 were ball bearings with non-contact metal seals, which each contains a wave press cage as mentioned above. The dimensions of the ball bearing were; inside diameter: 15 mm; outside diameter: 35 mm$\phi$; width: 11 mm. The test bearings 21 are packed with grease compositions each of 7 g prepared in Examples 1 to 11 and Comparative Examples 1 to 5. Eight test bearings 21 were used for each grease composition, and applied to the actual motor durability testing apparatus (axial load: about 39.2N). The actual motor durability testing apparatus was put in a constant temperature vessel set at 120° C., and the inner rings of the test bearings were rotated at 300 $\text{min}^{-1}$ or 5,600 $\text{min}^{-1}$ and for 1,000 hours. After 1,000 hours, the test bearing 21 is taken out of the vessel, and the acoustic characteristics were evaluated by using the following evaluation references.

An Anderon meter was used for the bearing acoustic measurement. Each test bearing was packed with a grease composition, and a bearing Anderon value immediately after the grease composition packing and a bearing Anderon value after the inner ring is rotated for 1,000 hours were compared for evaluating the acoustic characteristic of the bearing. The evaluation results of the acoustic characteristics are shown in Tables 1 to 3. In Tables 1 to 3, "○" indicates that the acoustic characteristic is not deteriorated; "Δ" indicates that the acoustic characteristics are somewhat deteriorated; and "×" indicates that the acoustic characteristics are deteriorated. From Tables 1 to 3, it is seen that a little deterioration of the acoustic characteristic is observed in Example 7, but in all Examples, satisfactory acoustic characteristics are obtained.

TABLE 1

| Composition · Property | | Example 1 | Example 2 | Example 3 | Example 4 | Example 5 | Example 6 | Example 7 |
|---|---|---|---|---|---|---|---|---|
| Thickener · Lithium Soap (g) | | 100 | 120 | 100 | 120 | 80 | 90 | 110 |
| Base Oil | Poly-α-olefinic Oil (g) | 340 | 498 | 637 | 498 | 348 | 647 | 318 |
| | Mineral Oil (g) | | | | | | | |
| | Polyol Ester Oil (g) | 510 | 332 | 213 | 166 | 330 | 213 | 330 |
| | Alkyl Diphenyl Ether Oil (g) | | | | 166 | 192 | | 192 |
| Additive | Alkenylsuccinic Acid Ester Oil (g) | 25 | 25 | 15 | | | 5 | |
| | Alkylsuccinic Acid Ether Oil (g) | | | | | 20 | 5 | |
| | Additional Carboxylic Acid (g) | | | | | | | |
| | Anti-oxidant, Rust Preventive, Metal Deactivator (g) | 25 | 25 | 35 | 30 | 50 | 40 | 50 |
| Kinematic Viscosity of Base Oil (mm²/s, 40° C.) | | 170 | 100 | 50 | 150 | 200 | 50 | 200 |
| Worked Penetration | | 280 | 270 | 290 | 270 | 280 | 285 | 285 |
| Fiber Structure | | Contains a long fibrous material in an amount of at least 30% | | | | | | |
| Dynamic Torque | | ⊚ | ⊚ | ⊚ | ⊚ | ○ | ⊚ | ○ |
| Cage Noise | +20° C. | ○ | ○ | ○ | ○ | ○ | ○ | ○ |
| | 0° C. | ○ | ○ | ○ | ○ | ○ | ○ | ○ |
| Fretting (Acoustic Characteristics) | | ⊚ | ⊚ | ⊚–○ | ⊚ | ⊚ | ○ | ⊚ |
| Acoustic Characteristics | 300 min⁻¹ | ○ | ○ | ○ | ○ | ○ | ○ | Δ |
| | 5,600 min⁻¹ | ○ | ○ | ○ | ○ | ○ | ○ | Δ |

TABLE 2

| Composition · Property | Example 8 | Example 9 | Example 10 | Example 11 |
|---|---|---|---|---|
| Thickener · Lithium Soap (g) | 120 | 120 | 120 | 120 |
| Base Oil | | | | |
| Poly-α-olefinic Oil (g) | 498 | 498 | 498 | 498 |
| Mineral Oil (g) | | | | |
| Polyol Ester Oil (g) | 332 | 332 | 332 | 332 |
| Alkyl Diphenyl Ether Oil (g) | | | | |
| Additive | | | | |
| Alkenylsuccinic Acid Ester Oil (g) | | 5 | 10 | |
| Alkylsuccinic Acid Ether Oil (g) | | 5 | | 10 |
| Additional Carboxylic Acid (g) | 25 | 5 | 10 | 10 |
| Anti-oxidant, Rust Preventive, Metal Deactivator (g) | 25 | 35 | 30 | 30 |
| Kinematic Viscosity of Base Oil (mm²/s, 40° C.) | 100 | 100 | 100 | 100 |
| Worked Penetration | 260 | 270 | 270 | 260 |
| Fiber Structure | Contains a long fibrous material in an amount of at least 30% | | | |
| Dynamic Torque | ⊚ | ⊚ | ⊚ | ⊚ |
| Cage Noise | | | | |
| +20° C. | ○ | ○ | ○ | ○ |
| 0° C. | ○ | ○ | ○ | ○ |
| Fretting (Acoustic Characteristics) | ⊚ | ⊚ | ⊚ | ⊚ |
| Acoustic Characteristics  300 min⁻¹ | ○ | ○ | ○ | ○ |
| 5,600 min⁻¹ | ○ | ○ | ○ | ○ |

TABLE 3

| Composition · Property | | Comparative Example 1 | Comparative Example 2 | Comparative Example 3 | Comparative Example 4 | Comparative Example 5 |
|---|---|---|---|---|---|---|
| Thickener · Lithium Soap (g) | | 120 | 130 | 100 | 120 | 120 |
| Base Oil | Poly-α-olefinic Oil (g) | | 410 | | 830 | |
| | Mineral Oil (g) | | | 850 | | |
| | Polyol Ester Oil (g) | 830 | 410 | | | 830 |
| | Alkyl Diphenyl Ether Oil (g) | | | | | |
| Additive | Alkenylsuccinic Acid Ester Oil (g) | | | | | |
| | Alkylsuccinic Acid Ether Oil (g) | | | | | |
| | Additional Carboxylic Acid (g) | | | | | |
| | Anti-oxidant, Rust Preventive, Metal Deactivator (g) | 50 | 50 | 50 | 50 | 50 |
| Kinematic Viscosity of Base Oil (mm²/s, 40° C.) | | 25 | 55 | 130 | 100 | 117 |
| Worked Penetration | | 250 | 245 | 270 | 277 | 276 |
| Fiber Structure | | Contains only a short fibrous material | Contains only a short fibrous material | Contains a long fibrous material in an amount of at least 30% | Contains a long fibrous material in an amount of at least 30% | Contains only a short fibrous material |
| Dynamic Torque | | ⊚ | ○ | Δ | ○–Δ | X |
| Cage Noise | +20° C. | ○ | ○ | ○ | Δ | Δ |
| | 0° C. | ○ | Δ | Δ | Δ | X |
| Fretting (Acoustic Characteristics) | | X | X | Δ | Δ | Δ |
| Acoustic Characteristics | 300 min⁻¹ | Δ | X | X | Δ | X |
| | 5,600 min⁻¹ | Δ | Δ | Δ | ○ | Δ |

EXAMPLE 12, COMPARATIVE EXAMPLES 6 TO 7 REFERENCE EXAMPLE 1

Figure 17:
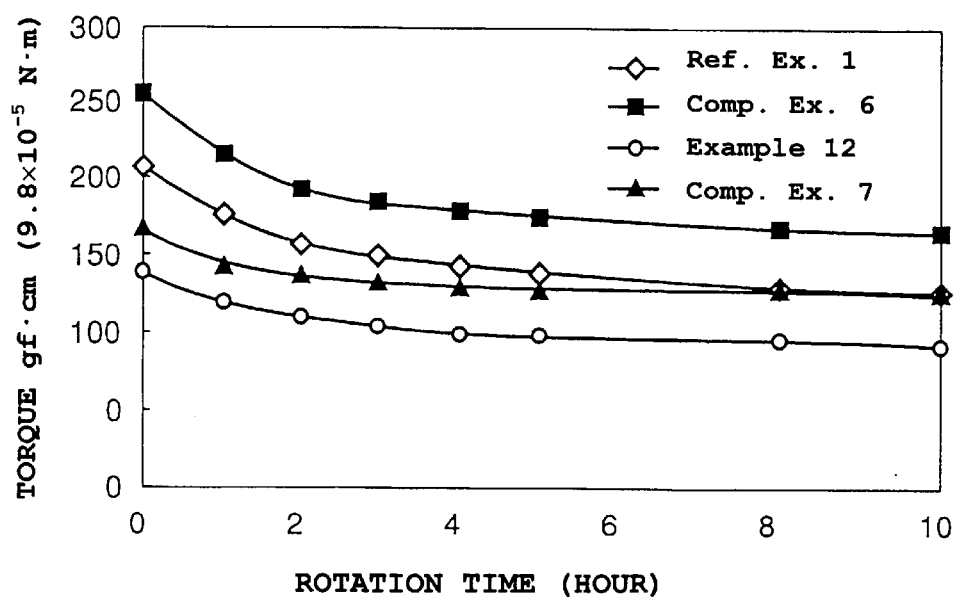
FIG. 17 is a graph showing bearing torque variations by the aging of the pockets of the cage, of which the inner peripheral surfaces have different configurations.
Figure 20:
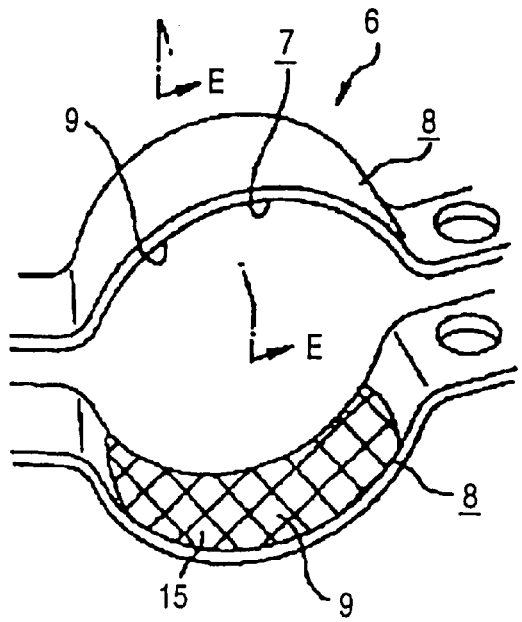
FIG. 20 is an enlarged, exploded view perspectively showing a part of a conventional cage.
Figure 21:
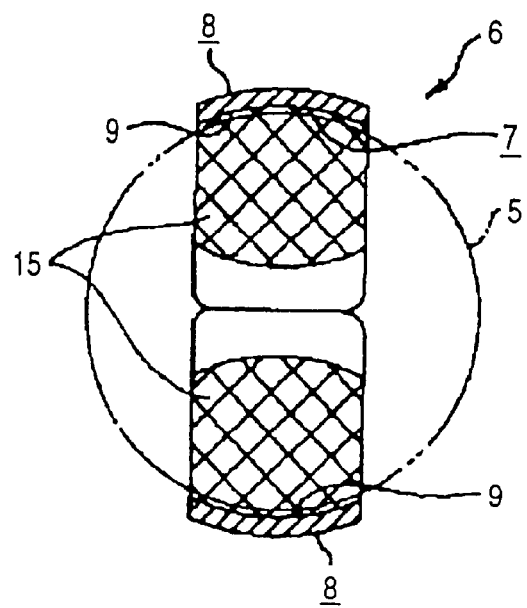
FIG. 21 is a cross sectional view taken on line E—E in FIG. 20.
Figure 22:
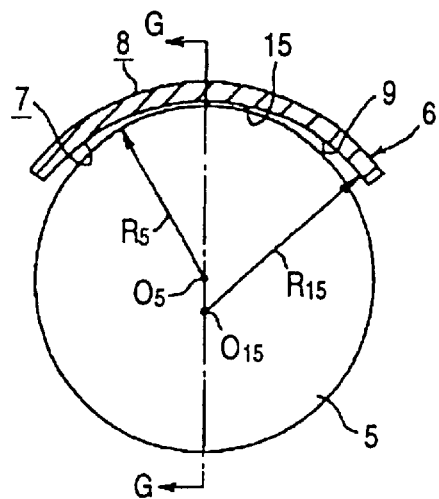
FIG. 22 is a cross sectional view showing the upper half of FIG. 21.

To verify the advantages of the wave press cage of the present invention, a wave press cage having the spherical part and the curved part shown in FIG. 2 was used in Example 12 and Reference Example 1, and a conventional wave press cage shown in FIG. 20 was used in Comparative Examples 6 and 7. The grease compositions shown in Table 4 were applied to test bearings. The test bearings were subjected to (1) bearing dynamic torque test, (2) bearing cage noise measurement, and (3) bearing acoustic durability test. For (3) bearing acoustic durability test, the inner ring was rotated for 3000 hours, and noise was measured after 1000 hours and 3000 hours. The measurement results of (2) bearing cage noise measurement, and (3) bearing acoustic durability test are both shown in Table 4. For the measurement result of (1) bearing dynamic torque test, a torque variation with respect to rotation time is shown in FIG. 17.

TABLE 4

| Composition · Property | Reference example 1 | Comparative example 6 | Example 12 | Comparative example 7 |
|---|---|---|---|---|
| Thickener · Lithium Soap (g) | 120 | 120 | 110 | 110 |
| Base Oil | | | | |
| Poly-α-olefinic Oil (g) | | | | |
| Mineral Oil (g) | | | | |
| Polyol Ester Oil (g) | 830 | 830 | 420 | 420 |
| Alkyl Diphenyl Ether Oil (g) | | | 420 | 420 |
| Additive | | | | |
| Alkenylsuccinic Acid Ester Oil (g) | | | | |
| Alkylsuccinic Acid Ether Oil (g) | | | | |
| Additional Carboxylic Acid (g) | | | | |
| Anti-oxidant, Rust Preventive, Metal Deactivator (g) | 50 | 50 | 50 | 50 |
| Kinematic Viscosity of Base Oil (mm²/s, 40° C.) | 120 | 120 | 50 | 50 |
| Worked Penetration | 260 | 260 | 235 | 235 |
| Fiber Structure | Contains only a short fibrous material | Contains only a short fibrous material | Contains a long fibrous material in an amount of at least 30% | Contains a long fibrous material in an amount of at least 30% |
| Cage Noise | | | | |
| +20° C. | ○ | Δ | ○ | ○ |
| 0° C. | Δ | X | ○ | ○ |
| Acoustic Characteristics | | | | |

TABLE 4-continued

| Composition · Property | Reference example 1 | | Comparative example 6 | | Example 12 | | Comparative example 7 | |
|---|---|---|---|---|---|---|---|---|
| Test Time (hour) | 1,000 | 3,000 | 1,000 | 3,000 | 1,000 | 3,000 | 1,000 | 3,000 |
| 300 min$^{-1}$ | Δ | Δ | X | — | ◯ | Δ | Δ | X |
| 5,600 min$^{-1}$ | ◯ | Δ | Δ | X | ◯ | ◯ | Δ | X |

From Table 4 and FIG. 17, the ball bearing containing the wave press cage having the spherical part and the curved part, which is constructed according to the present invention, were improved in bearing torque, cage noise and acoustic life, even if the same kind of grease composition is used. In particular, in Example 12 in which the grease compositions each formed by blending a metallic soap containing long fibrous material into a mixed oil are combined, the most excellent effects are produced.

Table 4 and FIG. 17 show the results of the ball bearings each containing the wave press cage according to the first or second aspect of the present invention. The same results as above can be obtained when the ball bearings each containing the crown-type cage according to the third or fourth aspect of the present invention are used.

EXAMPLES 13 TO 28 AND COMPARATIVE EXAMPLES 8 TO 12

In conformity with Examples 1 to 11 and Comparative Examples 1 to 5, the grease compositions according to the blendings shown in Tables 5 to 8 were prepared. The kinematic viscosity of poly-α-olefinic oil A used is 33 mm$^2$/s (at 40° C.), the kinematic viscosity of poly-α-olefinic oil B used is 60 mm$^2$/s (at 40° C.), the kinematic viscosity of poly-α-olefinic oil C used is 100 mm$^2$/s (at 40° C.), the kinematic viscosity of mineral oil used is 130 mm$^2$/s (at 40° C.), the kinematic viscosity of diester oil used is 12 mm$^2$/s (at 40° C.), the kinematic viscosity of polyol ester oil A used is 760 mm$^2$/s (at 100° C.), the kinematic viscosity of polyol ester oil B used is 33 mm$^2$/s (at 40° C.), the kinematic viscosity of polyol ester oil C used is 200 mm$^2$/s (at 40° C.), the kinematic viscosity of alkyl diphenyl ether oil A used is 100 mm$^2$/s (at 40° C.), and the kinematic viscosity of alkyl diphenyl ether oil B used is 67 mm$^2$/s (at 40° C.). Also the kinematic viscosity (at 40° C.) and worked penetration of the base oil (a mixture of a polar group-containing lubricant and a non-polar lubricant) are shown in the tables.

With use of each grease composition, the following measurements and tests were performed in the same manner as above: (1) bearing dynamic torque test, (2) bearing cage noise measurement (3) fretting test and (4) bearing acoustic durability test. The results are shown in Tables 5 to 8 based on the same evaluation criteria. The groove R for the inner raceway and the groove R for the outer raceway in the bearing to be tested are as follows.

Example 13: Groove R for an inner raceway=51.75%, Groove R for an outer raceway=53.0%
Example 14: Groove R for an inner raceway=51.5%, Groove R for an outer raceway=52.5%
Example 15: Groove R for an inner raceway=52.5%, Groove R for an outer raceway=54.5%
Example 16: Groove R for an inner raceway=53.0%, Groove R for an outer raceway=55.0%
Example 17: Groove R for an inner raceway=56.0%, Groove R for an outer raceway=58.0%
Example 18: Groove R for an inner raceway=50.5%, Groove R for an outer raceway=53.0%
Example 19: Groove R for an inner raceway=59.0%, Groove R for an outer raceway=59.75%
Examples 20 to 23 (which are the same as one another): Groove R for an inner raceway=51.0%, Groove R for an outer raceway=53.0%
Examples 24 to 28 (which are the same as one another): Groove R for an inner raceway=51.75%, Groove R for an outer raceway=53.0%
Comparative Examples 8 to 12 (which are the same as one another): Groove R for an inner raceway=52.0%, Groove R for an outer raceway=52.0%

As is shown in Tables 5 to 8, all the examples give results superior to the comparative examples.

TABLE 5

| Composition · Property | | Example 13 | Example 14 | Example 15 | Example 16 | Example 17 | Example 18 | Example 19 |
|---|---|---|---|---|---|---|---|---|
| Thickener · Lithium Soap (g) | | 100 | 120 | 100 | 120 | 80 | 90 | 110 |
| Base Oil | Poly-α-olefinic Oil A (g) | | | | | | 30 | |
| | Poly-α-olefinic Oil B (g) | 340 | 498 | 636 | 498 | 348 | 617 | 318 |
| | Poly-α-olefinic Oil C (g) | | | | | | | |
| | Mineral Oil (g) | | | | | | | |
| | Diester Oil (g) | | | | | | | |
| | Polyol Ester Oil A (g) | 170 | 42 | 43 | 124 | 235 | 43 | 230 |
| | Polyol Ester Oil B (g) | | | 171 | | | 170 | |
| | Polyol Ester Oil C (g) | 340 | 290 | | 42 | 95 | | 100 |
| | Alkyl Diphenyl Ether Oil A (g) | | | | | | | |
| | Alkyl Diphenyl Ether Oil B (g) | | | | 166 | 192 | | 192 |
| Additive | Alkenylsuccinic Acid Ester Oil (g) | 25 | 25 | 15 | | | 5 | |
| | Alkylsuccinic Acid Ether Oil (g) | | | | 20 | | 5 | |
| | Additional Carboxylic | | | | | | | |

TABLE 5-continued

| Composition · Property | | Example 13 | Example 14 | Example 15 | Example 16 | Example 17 | Example 18 | Example 19 |
|---|---|---|---|---|---|---|---|---|
| | Acid (g) | | | | | | | |
| | Anti-oxidant, Rust Preventive, Metal Deactivator (g) | 25 | 25 | 35 | 30 | 50 | 40 | 50 |
| Kinematic Viscosity of Base Oil (mm²/s, 40° C.) | | 170 | 100 | 50 | 150 | 200 | 50 | 200 |
| Worked Penetration | | 280 | 270 | 290 | 270 | 280 | 285 | 285 |
| Fiber Structure | | Contains a long fibrous material in an amount of at least 30% | | | | | | |
| Dynamic Torque | | ◎ | ◎ | ◎ | ◎ | ◎ | ○ | ○ |
| Cage Noise | +20° C. | ○ | ○ | ○ | ○ | ○ | ○ | ○ |
| | 0° C. | ○ | ○ | ○ | ○ | ○ | ○ | ○ |
| Fretting (Acoustic Characteristics) | | ◎ | ◎ | ◎–○ | ◎ | ◎ | ◎ | ◎ |
| Acoustic Characteristics | 300 min⁻¹ | ○ | ○ | ○ | ○ | ○ | ○ | Δ |
| | 5,600 min⁻¹ | ○ | ○ | ○ | ○ | ○ | ○ | Δ |

TABLE 6

| Composition · Property | | Example 20 | Example 21 | Example 22 | Example 23 | Example 24 | Example 25 | Example 26 |
|---|---|---|---|---|---|---|---|---|
| Thickener · Lithium Soap (g) | | 120 | 120 | 120 | 120 | 80 | 100 | 115 |
| Base Oil | Poly-α-olefinic Oil A (g) | | | | | | 340 | 260 |
| | Poly-α-olefinic Oil B (g) | 498 | 498 | 498 | 498 | 260 | | |
| | Poly-α-olefinic Oil C (g) | | | | | | | |
| | Mineral Oil (g) | | | | | | | |
| | Diester Oil (g) | | | | | | | 125 |
| | Polyol Ester Oil A (g) | 42 | 42 | 42 | 42 | 132 | 43 | 50 |
| | Polyol Ester Oil B (g) | | | | | 218 | 340 | 400 |
| | Polyol Ester Oil C (g) | 290 | 290 | 290 | 290 | 260 | 127 | |
| | Alkyl Diphenyl Ether Oil A (g) | | | | | | | |
| | Alkyl Diphenyl Ether Oil B (g) | | | | | | | |
| Additive | Alkenylsuccinic Acid Ester Oil (g) | | 5 | 10 | | | 25 | 15 |
| | Alkylsuccinic Acid Ether Oil (g) | | 5 | | 10 | | | |
| | Additional Carboxylic Acid (g) | 25 | 5 | 10 | 10 | | | |
| | Anti-oxidant, Rust Preventive, Metal Deactivator (g) | 25 | 35 | 30 | 30 | 50 | 25 | 35 |
| Kinematic Viscosity of Base Oil (mm²/s, 40° C.) | | 100 | 100 | 100 | 100 | 115 | 60 | 60 |
| Worked Penetration | | 260 | 270 | 270 | 260 | 300 | 285 | 270 |
| Fiber Structure | | Contains a long fibrous material in an amount of at least 30% | | | | | | |
| Dynamic Torque | | ◎ | ◎ | ◎ | ◎ | ◎ | ◎ | ◎ |
| Cage Noise | +20° C. | ○ | ○ | ○ | ○ | ○ | ○ | ○ |
| | 0° C. | ○ | ○ | ○ | ○ | ○ | ○ | ○ |
| Fretting (Acoustic Characteristics) | | ◎ | ◎ | ◎ | ◎ | ◎ | ○ | ○ |
| Acoustic Characteristics | 300 min⁻¹ | ○ | ○ | ○ | ○ | ○ | ○ | ○ |
| | 5,600 min⁻¹ | ○ | ○ | ○ | ○ | ○ | ○ | ○ |

TABLE 7

| Composition · Property | | Example 27 | Example 28 |
|---|---|---|---|
| Thickener · Lithium Soap (g) | | 130 | 80 |
| Base Oil | Poly-α-olefinic Oil A (g) | 620 | |
| | Poly-α-olefinic Oil B (g) | | 348 |
| | Poly-α-olefinic Oil C (g) | | |
| | Mineral Oil (g) | | |
| | Diester Oil (g) | | |
| | Polyol Ester Oil A (g) | 42 | 235 |
| | Polyol Ester Oil B (g) | | |
| | Polyol Ester Oil C (g) | 158 | 95 |
| | Alkyl Diphenyl Ether Oil A (g) | | |
| | Alkyl Diphenyl Ether Oil B (g) | | 192 |
| Additive | Alkenylsuccinic Acid Ester Oil (g) | | |
| | Alkylsuccinic Acid Ether Oil (g) | | 20 |
| | Additional Carboxylic Acid (g) | | |
| | Anti-oxidant, | 30 | 50 |

TABLE 7-continued

| Composition · Property | | Example 27 | Example 28 |
|---|---|---|---|
| Rust Preventive, Metal Deactivator (g) | | | |
| Kinematic Viscosity of Base Oil (mm²/s, 40° C.) | | 80 | 130 |
| Worked Penetration | | 250 | 290 |
| Fiber Structure | | | Contains a long fibrous material in an amount of at least 30% |
| Dynamic Torque | | ◎ | ◎ |
| Cage Noise | +20° C. | ○ | ○ |
| | 0° C. | ○ | ○ |
| Fretting (Acoustic Characteristics) | | ○ | ◎ |
| Acoustic Characteristics | 300 min⁻¹ | ○ | ○ |
| | 5,600 min⁻¹ | ○ | ○ |

TABLE 8

| Composition · Property | | Comp. Ex. 8 | Comp. Ex. 9 | Comp. Ex. 10 | Comp. Ex. 11 | Comp. Ex. 12 |
|---|---|---|---|---|---|---|
| Thickener · Lithium Soap (g) | | 120 | 130 | 100 | 120 | 120 |
| Base Oil | Poly-α-olefinic Oil A (g) | | | | | |
| | Poly-α-olefinic Oil B (g) | | 410 | | | |
| | Poly-α-olefinic Oil C (g) | | | | 830 | |
| | Mineral Oil (g) | | | 850 | | |
| | Diester Oil (g) | 750 | 410 | | | |
| | Polyol Ester Oil C (g) | | | | | 290 |
| | Polyol Ester Oil D (g) | | | | | 540 |
| | Polyol Ester Oil E (g) | 80 | | | | |
| | Alkyl Diphenyl Ether Oil A (g) | | | | | |
| | Alkyl Diphenyl Ether Oil B (g) | | | | | |
| Additive | Alkenylsuccinic Acid Ester Oil (g) | | | | | |
| | Alkylsuccinic Acid Ether Oil (g) | | | | | |
| | Additional Carboxylic Acid (g) | | | | | |
| | Anti-oxidant, Rust Preventive, Metal Deactivator (g) | 50 | 50 | 50 | 50 | 50 |
| Kinematic Viscosity of Base Oil (mm²/s, 40° C.) | | 25 | 55 | 130 | 100 | 117 |
| Worked Penetration | | 250 | 245 | 270 | 277 | 276 |
| Fiber Structure | | Contains only a short fibrous material | Contains only a short fibrous material | Contains a long fibrous material in an amount of at least 30% | Contains a long fibrous material in an amount of at least 30% | Contains only a short fibrous material |
| Dynamic Torque | | ◎ | ◎ | X | ○–Δ | X |
| Cage Noise | +20° C. | ○ | ○ | ○ | Δ | Δ |
| | 0° C. | ○ | Δ | Δ | Δ | X |
| Fretting (Acoustic Characteristics) | | X | X | Δ | Δ | Δ |
| Acoustic Characteristics | 300 min⁻¹ | Δ | X | X | Δ | X |
| | 5,600 min⁻¹ | Δ | Δ | Δ | ○ | Δ |

One can derive the lower limit and the upper limit for the radius of curvature of the cross-sectional shape of the inner raceway and the radius of curvature of the cross-sectional shape of the outer raceway to the ball diameter in ball bearings that achieve level "◎" for dynamic torque and level "O" for acoustic characteristics in Examples 13 to 28 as follows: for the inner raceway, the radii of curvature of the cross-sectional shapes are 51.0 to 56.0% of ball diameter, and for the outer raceway, the radii of curvature of the cross-sectional shapes are 52.5 to 58.0%. Furthermore, with a radius of curvature of the cross-sectional shape of the inner raceway of 50.5 to 56.0% of ball diameter combined with a radius of curvature of the cross-sectional shape of the outer raceway of 53.0 to 58.0% of ball diameter, results similar to those as above are obtained.

Figure 18:
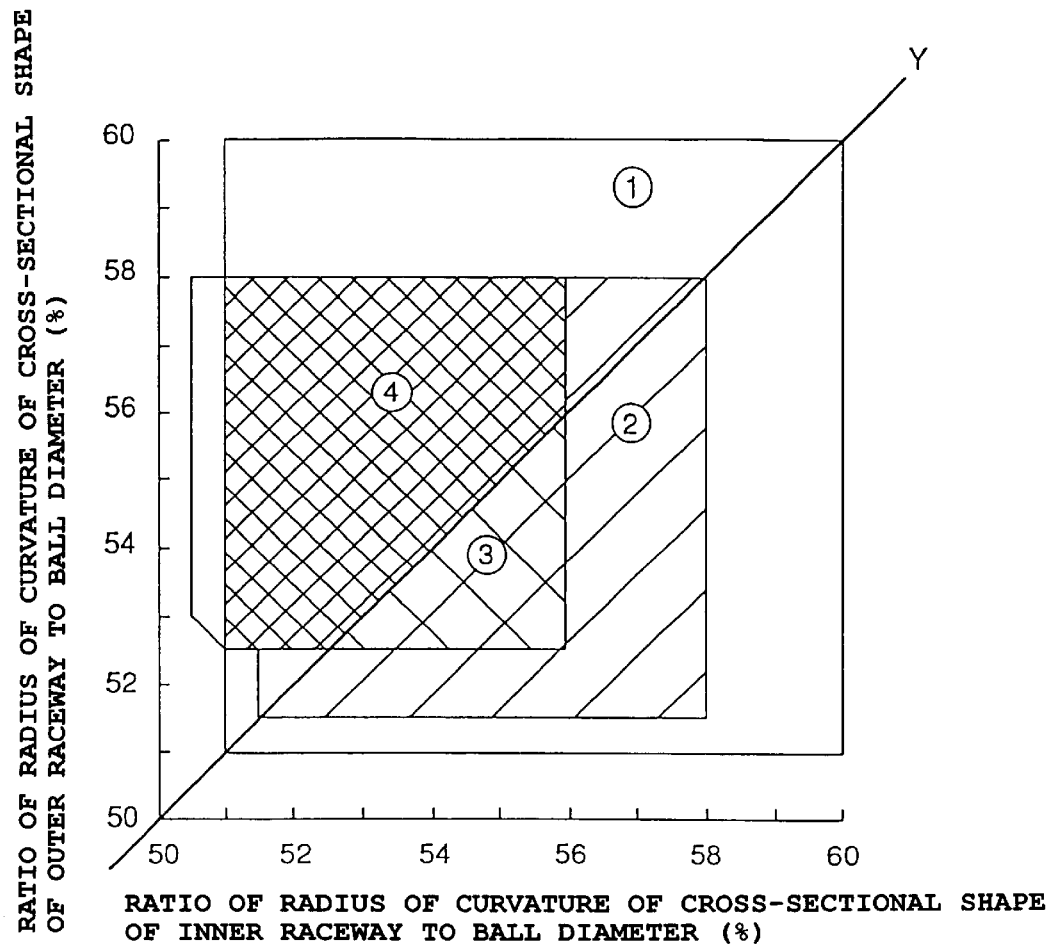
FIG. 18 is a graph showing the relation between the ratio of the radius of curvature of the cross-sectional shape of the inner raceway to the diameter of the ball and the ratio of the radius of curvature of the cross-sectional shape of the outer raceway to the diameter of the ball, in the ball bearing of the above-described first aspect or third aspect of the present invention.

Based on such data on the examples and comparative examples, in the present invention, the preferable dimensional relation among the radii of curvature of the cross-sectional shapes of the inner and outer raceways and the diameter of the ball are summarized as shown in FIG. 18. In the figure, area ① indicates a region satisfying the first aspect and the third aspect of the present invention, area ② indicates a more preferable region, area ③ indicates a still more preferably region and area ④ indicates a most preferable region. Low torque, acoustic characteristics and anti-fretting characteristics become more and more improved in the ascending order of area ①, area ②, area ③ and area ④. Line Y includes the points representing the cases where the radius of curvature of the cross-sectional shape of the inner raceway is the same as the radius of curvature of the cross-sectional shape of the outer raceway. Above this line Y, i.e., where the radius of curvature of the cross-sectional shape of the outer raceway is larger than the radius of curvature of the cross-sectional shape of the inner raceway, the difference in contact area and surface pressure between the inner raceway and the ball and between the outer raceway and the ball becomes small, thus resulting in improved torque decrease and acoustic characteristics.

EXAMPLES 29 TO 52 AND COMPARATIVE EXAMPLES 13 TO 16

In conformity with Examples 1 to 11 and Comparative Examples 1 to 5, the grease compositions according to the compositions shown in Tables 9 to 13 were prepared. The kinematic viscosity of poly-α-olefinic oil A used is 33 mm²/s (at 40° C.), the kinematic viscosity of poly-α-olefinic oil B used is 60 mm²/s (at 40° C.), the kinematic viscosity of poly-α-olefinic oil C used is 100 mm²/s (at 40° C.), the kinematic viscosity of mineral oil used is 130 mm²/s (at 40° C.), the kinematic viscosity of diester oil used is 12 mm²/s (at 40° C.) the kinematic viscosity of polyol ester oil A used is 760 mm²/s (at 100° C.), the kinematic viscosity of polyol ester oil B used is 33 mm²/s (at 40° C.), the kinematic viscosity of polyol ester oil C used is 200 mm²/s (at 40° C.), the kinematic viscosity of alkyl diphenyl ether oil A used is 100 mm²/s (at 40° C.), and the kinematic viscosity of alkyl diphenyl ether oil B used is 67 mm²/s (at 40° C.). Also the kinematic viscosity (at 40° C.) and worked penetration of the base oil (a mixture of a polar group-containing lubricant and a non-polar lubricant) are shown in the tables.

With use of each grease composition, the following measurements and tests were performed in the same manner as above: (1) bearing dynamic torque test, (2) bearing cage noise measurement (3) fretting test and (4) bearing acoustic durability test. The results are shown in Tables 9 to 13 based on the same evaluation criteria. The groove R for the inner raceway and the groove R for the outer raceway in the bearing to be tested are as follows.

Example 29: Groove R for an inner raceway=51.75%, Groove R for an outer raceway=53.0%
Example 30: Groove R for an inner raceway=51.5%, Groove R for an outer raceway=52.5%
Example 31: Groove R for an inner raceway=52.5%, Groove R for an outer raceway=54.5%
Example 32: Groove R for an inner raceway=53.0%, Groove R for an outer raceway=55.0%
Example 33: Groove R for an inner raceway=56.0%, Groove R for an outer raceway=58.0%
Comparative Example 13: Groove R for an inner raceway=51.0%, Groove R for an outer raceway=53.0%
Comparative Example 14: Groove R for an inner raceway=59.0%, Groove R for an outer raceway=59.75%
Examples 34 to 37 (which are the same as one another): Groove R for an inner raceway=51.5%, Groove R for an outer raceway=53.0%
Example 38: Groove R for an inner raceway=51.75%, Groove R for an outer raceway=53.0%
Example 39: Groove R for an inner raceway=51.5%, Groove R for an outer raceway=52.5%
Example 40: Groove R for an inner raceway=52.5%, Groove R for an outer raceway=54.5%
Example 41: Groove R for an inner raceway=53.0%, Groove R for an outer raceway=55.0%
Example 42: Groove R for an inner raceway=56.0%, Groove R for an outer raceway=58.0%
Comparative Example 15: Groove R for an inner raceway=51.0%, Groove R for an outer raceway=53.0%
Comparative Example 16: Groove R for an inner raceway=59.0%, Groove R for an outer raceway=59.75%
Examples 43 to 51 (which are the same as one another): Groove R for an inner raceway=51.5%, Groove R for an outer raceway=53.0%
Example 52: Groove R for an inner raceway=52.5%, Groove R for an outer raceway=53.0%

Figure 19:
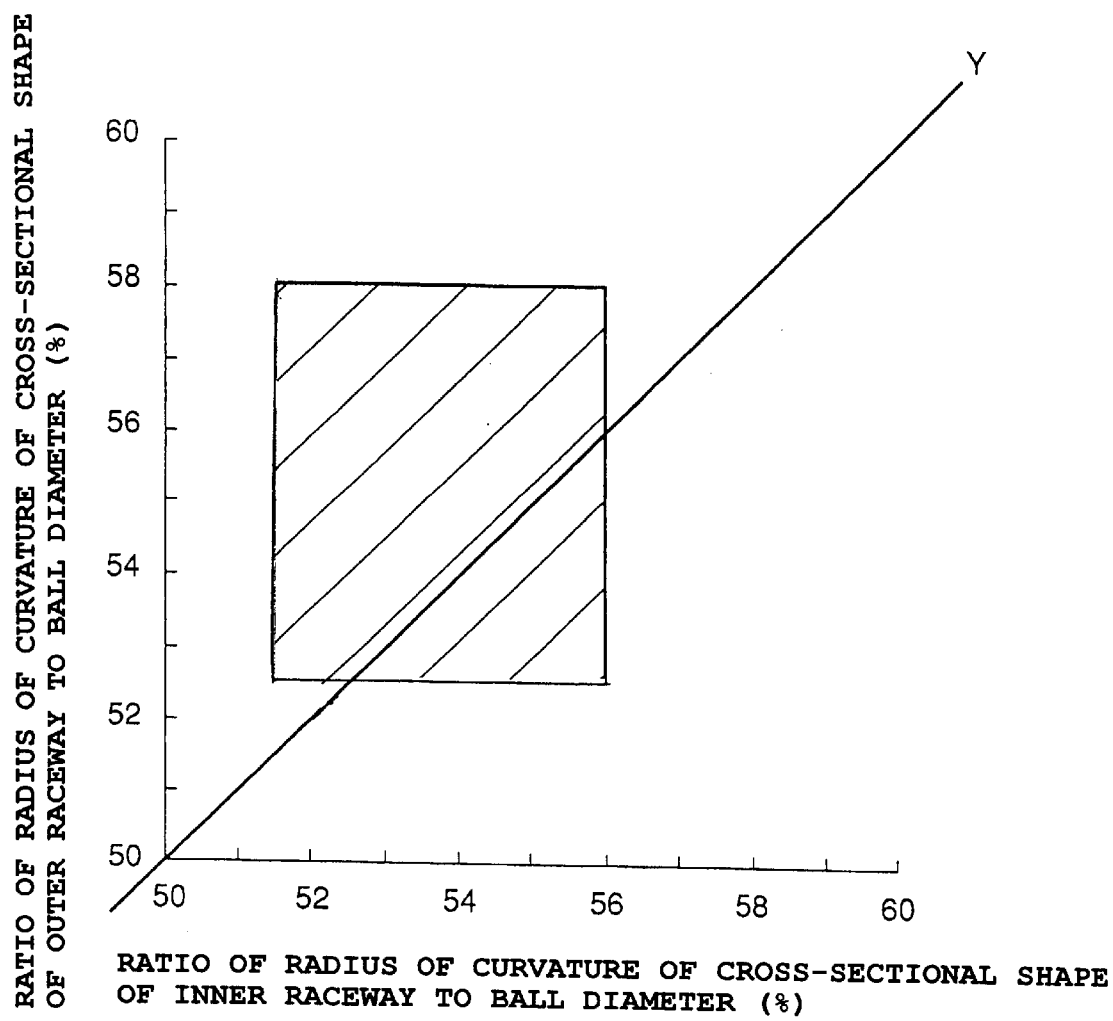
FIG. 19 is a graph showing the relation between the ratio of the radius of curvature of the cross-sectional shape of the inner raceway to the diameter of the ball and the ratio of the radius of curvature of the cross-sectional shape of the outer raceway to the diameter of the ball, in the ball bearing of the above-described second aspect or fourth aspect of the present invention.

As is shown in Tables 9 to 13, all the examples give results superior to the comparative examples. In Examples 29 to 52, where the lower limit and upper limit of each of the radius of curvature of the cross-sectional shape of the inner raceway to the ball diameter and the ratio of the radius of curvature of the cross-sectional shape of the outer raceway to the ball diameter in the range where the kinematic viscosity of the base oil is from 25 mm²/s (at 40° C.) to 150 mm²/s (at 40° C.) were obtained, when the ratio of the radius of curvature of the cross-sectional shape of the inner raceway to the ball diameter is from 51.5% to 56.0% and the ratio of the radius of curvature of the cross-sectional shape of the outer raceway to the ball diameter is from 52.5% to 58.0%, superior results are obtained. The range of the ratio of the radius of curvature is illustrated in FIG. 19 in the same manner as in FIG. 18.

Furthermore, in Example 52, the reason why the fretting characteristics (acoustic characteristics) were superior in spite of the kinematic viscosity of the base oil as low as 25 mm²/s (at 40° C.) is that the groove R was large in such manner that the ratio of the radius of curvature of the cross-sectional shape of the inner raceway to the ball diameter was 52.5%.

TABLE 9

| Composition · Property | | Example 29 | Example 30 | Example 31 | Example 32 | Example 33 | Comp. Ex. 13 | Comp. Ex. 14 |
|---|---|---|---|---|---|---|---|---|
| Thickener · Lithium Soap (g) | | 100 | 120 | 100 | 120 | 80 | 90 | 110 |
| Base Oil | Poly-α-olefinic Oil (g) | 340 | 498 | 637 | 498 | 348 | 647 | 318 |
| | Mineral Oil (g) | | | | | | | |
| | Polyol Ester Oil (g) | 510 | 332 | 213 | 166 | 330 | 213 | 330 |
| | Alkyl Diphenyl Ether Oil A (g) | | | | 166 | 192 | | 192 |
| Additive | Alkenylsuccinic Acid Ester Oil (g) | 25 | 25 | 15 | | | 5 | |
| | Alkylsuccinic Acid Ether Oil (g) | | | | 20 | | 5 | |
| | Additional Carboxylic Acid (g) | | | | | | | |
| | Anti-oxidant, Rust Preventive, Metal Deactivator (g) | 25 | 25 | 35 | 30 | 50 | 40 | 50 |
| Kinematic Viscosity of Base Oil (mm²/s, 40° C.) | | 70 | 100 | 50 | 120 | 150 | 150 | 50 |
| Worked Penetration | | 280 | 270 | 290 | 270 | 280 | 285 | 285 |

TABLE 9-continued

| Composition · Property | | Example 29 | Example 30 | Example 31 | Example 32 | Example 33 | Comp. Ex. 13 | Comp. Ex. 14 |
|---|---|---|---|---|---|---|---|---|
| Fiber Structure | | Conventional Production Method (Only a short fibrous material was contained. A long fibrous material was not intentionally produced.) | | | | | | |
| Dynamic Torque | | ⊚ | ⊚–○ | ⊚ | ○ | ○ | X | ○ |
| Cage Noise | +20° C. | ○ | ○ | ○ | ○ | ○ | ○ | ○ |
| | 0° C. | ○ | ○ | ○ | ○ | ○ | ○ | ○ |
| Fretting (Acoustic Characteristics) | | ⊚ | ⊚ | ⊚–○ | ⊚ | ⊚ | ○ | ⊚ |
| Acoustic | 300 min$^{-1}$ | ○ | ○ | ○ | ○ | ○ | ○ | Δ |
| Characteristics | 5,600 min$^{-1}$ | ○ | ○ | ○ | ○ | ○ | ○ | X |

TABLE 10

| Composition · Property | Example 34 | Example 35 | Example 36 | Example 37 |
|---|---|---|---|---|
| Thickener · Lithium Soap (g) | 120 | 120 | 120 | 120 |
| Base Oil | | | | |
| Poly-α-olefinic Oil (g) | 498 | 498 | 498 | 498 |
| Mineral Oil (g) | | | | |
| Polyol Ester Oil (g) | 332 | 332 | 332 | 332 |
| Alkyl Diphenyl Ether Oil (g) | | | | |
| Additive | | | | |
| Alkenylsuccinic Acid Ester Oil (g) | | 5 | 10 | |
| Alkylsuccinic Acid Ether Oil (g) | | 5 | | 10 |
| Additional Carboxylic Acid (g) | 25 | 5 | 10 | 10 |
| Anti-oxidant, Rust Preventive, Metal Deactivator (g) | 25 | 35 | 30 | 30 |
| Kinematic Viscosity of Base Oil (mm$^2$/s, 40° C.) | 100 | 100 | 100 | 100 |
| Worked Penetration | 260 | 270 | 270 | 260 |
| Fiber Structure | Conventional Production Method (Only a short fibrous material was contained. A long fibrous material was not intentionally produced.) | | | |
| Dynamic Torque | ⊚–○ | ⊚–○ | ⊚–○ | ⊚–○ |
| Cage Noise | | | | |
| +20° C. | ○ | ○ | ○ | ○ |
| 0° C. | ○ | ○ | ○ | ○ |
| Fretting (Acoustic Characteristics) | ⊚ | ⊚ | ⊚ | ⊚ |
| Acoustic Characteristics | | | | |
| 300 min$^{-1}$ | ○ | ○ | ○ | ○ |
| 5,600 min$^{-1}$ | ○ | ○ | ○ | ○ |

TABLE 11

| Composition · Property | | Example 38 | Example 39 | Example 40 | Example 41 | Example 42 | Comp. Ex. 15 | Comp. Ex. 16 |
|---|---|---|---|---|---|---|---|---|
| Thickener · Lithium Soap (g) | | 100 | 120 | 100 | 120 | 80 | 90 | 110 |
| Base Oil | Poly-α-olefinic Oil A (g) | | | | | | 617 | |
| | Poly-α-olefinic Oil B (g) | 340 | 498 | 636 | 498 | 348 | 30 | 318 |
| | Poly-α-olefinic Oil C (g) | | | | | | | |
| | Mineral Oil (g) | | | | | | | |
| | Diester Oil (g) | | | | | | | |
| | Polyol Ester Oil A (g) | 170 | 42 | 43 | 124 | 235 | 43 | 230 |
| | Polyol Ester Oil B (g) | | | 171 | | | 170 | |
| | Polyol Ester Oil C (g) | 340 | 290 | | 42 | 95 | | 100 |
| | Alkyl Diphenyl Ether Oil A (g) | | | | | | | |
| | Alkyl Diphenyl Ether Oil B (g) | | | | 166 | 192 | | 192 |
| Additive | Alkenylsuccinic Acid Ester Oil (g) | 25 | 25 | 15 | | | 5 | |
| | Alkylsuccinic Acid Ether Oil (g) | | | | 20 | | 5 | |
| | Additional Carboxylic Acid (g) | | | | | | | |
| | Anti-oxidant, Rust Preventive, Metal Deactivator (g) | 25 | 25 | 35 | 30 | 50 | 40 | 50 |
| Kinematic Viscosity of Base Oil (mm$^2$/s, 40° C.) | | 170 | 100 | 50 | 150 | 175 | 40 | 200 |

TABLE 11-continued

| Composition · Property | | Example 38 | Example 39 | Example 40 | Example 41 | Example 42 | Comp. Ex. 15 | Comp. Ex. 16 |
|---|---|---|---|---|---|---|---|---|
| Worked Penetration | | 280 | 270 | 290 | 270 | 280 | 285 | 285 |
| Fiber Structure | | Conventional Production Method (Only a short fibrous material was contained. A long fibrous material was not intentionally produced.) | | | | | | |
| Dynamic Torque | | ○ | ⊚–○ | ⊚ | ○ | ○ | ○ | X |
| Cage Noise | +20° C. | ○ | ○ | ○ | ○ | ○ | ○ | ○ |
| | 0° C. | ○ | ○ | ○ | ○ | ○ | ○ | ○ |
| Fretting (Acoustic Characteristics) | | ⊚ | ⊚ | ⊚–○ | ⊚ | ⊚ | ○ | ⊚ |
| Acoustic Characteristics | 300 min$^{-1}$ | ○ | ○ | ○ | ○ | ○ | Δ | Δ |
| | 5,600 min$^{-1}$ | ○ | ○ | ○ | ○ | ○ | X | Δ |

TABLE 12

| Composition · Property | Example 43 | Example 44 | Example 45 | Example 46 | Example 47 | Example 48 | Example 49 |
|---|---|---|---|---|---|---|---|
| Thickener · Lithium Soap (g) | 120 | 120 | 120 | 120 | 80 | 100 | 115 |
| Base Oil | | | | | | | |
| Poly-α-olefinic Oil A (g) | | | | | | 340 | 260 |
| Poly-α-olefinic Oil B (g) | 498 | 498 | 498 | 498 | 260 | | |
| Poly-α-olefinic Oil C (g) | | | | | | | |
| Mineral Oil (g) | | | | | | | |
| Diester Oil (g) | | | | | | | 125 |
| Polyol Ester Oil A (g) | 42 | 42 | 42 | 42 | 132 | 43 | 50 |
| Polyol Ester Oil B (g) | | | | | 218 | 340 | 400 |
| Polyol Ester Oil C (g) | 290 | 290 | 290 | 290 | 260 | 127 | |
| Alkyl Diphenyl Ether Oil A (g) | | | | | | | |
| Alkyl Diphenyl Ether Oil B (g) | | | | | | | |
| Additive | | | | | | | |
| Alkenylsuccinic Acid Ester Oil (g) | | 5 | 10 | | | 25 | 15 |
| Alkylsuccinic Acid Ether Oil (g) | | 5 | | 10 | | | |
| Additional Carboxylic Acid (g) | 25 | 5 | 10 | 10 | | | |
| Anti-oxidant, Rust Preventive, Metal Deactivator (g) | 25 | 35 | 30 | 30 | 50 | 25 | 35 |
| Kinematic Viscosity of Base Oil (mm$^2$/s, 40° C.) | 100 | 100 | 100 | 100 | 115 | 60 | 60 |
| Worked Penetration | 260 | 270 | 270 | 260 | 300 | 285 | 270 |
| Fiber Structure | Conventional Production Method (Only a short fibrous material was contained. A long fibrous material was not intentionally produced.) | | | | | | |
| Dynamic Torque | ⊚–○ | ⊚–○ | ⊚–○ | ⊚–○ | ○ | ⊚ | ⊚ |
| Cage Noise | | | | | | | |
| +20° C. | ○ | ○ | ○ | ○ | ○ | ○ | ○ |
| 0° C. | ○ | ○ | ○ | ○ | ○ | ○ | ○ |
| Fretting (Acoustic Characteristics) | ⊚ | ⊚ | ⊚ | ⊚ | ⊚ | ○ | ○ |
| Acoustic Characteristics | | | | | | | |
| 300 min$^{-1}$ | ○ | ○ | ○ | ○ | ○ | ○ | ○ |
| 5,600 min$^{-1}$ | ○ | ○ | ○ | ○ | ○ | ○ | ○ |

TABLE 13

| Composition · Property | Example 50 | Example 51 | Example 52 |
|---|---|---|---|
| Thickener · Lithium Soap (g) | 130 | 80 | 120 |
| Base Oil | | | |
| Poly-α-olefinic Oil A (g) | 620 | | |
| Poly-α-olefinic Oil B (g) | | 348 | |
| Poly-α-olefinic Oil C (g) | | | |
| Mineral Oil (g) | | | |
| Diester Oil (g) | | | 665 |
| Polyol Ester Oil A (g) | 42 | 235 | |
| Polyol Ester Oil B (g) | | | 165 |
| Polyol Ester Oil C (g) | 158 | 95 | |
| Alkyl Diphenyl Ether Oil | | | |

TABLE 13-continued

| Composition · Property | Example 50 | Example 51 | Example 52 |
|---|---|---|---|
| A (g) | | | |
| Alkyl Diphenyl Ether Oil | | 192 | |
| B (g) | | | |
| Additive | | | |
| Alkenylsuccinic Acid Ester Oil (g) | | | |
| Alkylsuccinic Acid Ether Oil (g) | 20 | | |
| Additional Carboxylic Acid (g) | | | |
| Anti-oxidant, Rust Preventive, Metal Deactivator (g) | 30 | 50 | 50 |
| Kinematic Viscosity of Base Oil (mm²/s, 40° C.) | 80 | 130 | 25 |
| Worked Penetration | 250 | 290 | 255 |
| Fiber Structure | Conventional Production Method (Only a short fibrous material was contained. A long fibrous material was not intentionally produced.) | | |
| Dynamic Torque | ◎ | ○ | ◎ |
| Cage Noise | | | |
| +20° C. | ○ | ○ | ○ |
| 0° C. | ○ | ○ | ○ |
| Fretting (Acoustic Characteristics) | ○ | ◉ | ○ |
| Acoustic Characteristics | | | |
| 300 min⁻¹ | ○ | ○ | ○ |
| 5,600 min⁻¹ | ○ | ○ | ○ |

As seen from the foregoing description, according to the present invention, a ball bearing which reduces the noise, vibration, fretting damage (abrasion) and torque of the ball bearing, and improves the acoustic durability of the cage noise can be provided.

While the invention has been described in detail and with reference to specific embodiments thereof, it will be apparent to those skilled in the art that various changes and modifications can be made therein without departing from the spirit and scope thereof.

What is claimed is:

1. A ball bearing comprising an outer ring having on its inner periphery an outer raceway, an inner ring having on its outer periphery an inner raceway, plural balls rotatably disposed between said outer raceway and said inner raceway, a cage holding said plural balls in a freely rotatable manner, and a grease packed in a space between said outer raceway and said inner raceway, wherein said grease comprises a base oil comprising a lubricant having a polar group in its molecular structure and a non-polar lubricant and a metallic soap-based thickener containing a long fibrous material whose fiber length is at least 3 $\mu$m in an amount of at least 30% by mass based on the total amount of the thickener; the inner peripheral surface of each pocket of the cage comprises a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket; and the radius of curvature of the cross-sectional shape of said inner raceway and the radius of curvature of the cross-sectional shape of said outer raceway are in the range from 51.0% to smaller than 60.0% of the diameter of each ball.

2. The ball bearing as claimed in claim 1, wherein the radius of curvature of said curved part of said cage is infinite.

3. The ball bearing as claimed in claim 1, wherein said base oil comprises a lubricant having a polar group in an amount of 5 to 70% by mass based on total amount of the base oil.

4. The ball bearing as claimed in claim 1, wherein said base oil has a kinematic viscosity of 10 to 500 mm²/s at 40° C.

5. The ball bearing as claimed in claim 4, wherein said base oil comprises a lubricant having a polar group which has a kinematic viscosity of 2,000 to 100,000 mm²/s at 40° C.

6. The ball bearing as claimed in claim 5, wherein said base oil comprises a low-viscosity lubricant having a polar group which has a kinematic viscosity of 10 to smaller than 150 mm²/s at 40° C.

7. The ball bearing as claimed in claim 6, wherein said low-viscosity lubricant having a polar group is at least one oil selected from the group consisting of a polyol ester oil, a diester oil and an ether oil.

8. The ball bearing as claimed in claim 5, wherein said base oil comprises a medium-viscosity lubricant having a polar group which has a kinematic viscosity of 150 to smaller than 2,000 mm²/s at 40° C.

9. The ball bearing as claimed in claim 5, wherein said base oil comprises a lubricant having a polar group which has a kinematic viscosity of 2,000 to 100,000 mm²/s at 40° C. in an amount of 5 to 30% by mass based on the total amount of the base oil.

10. The ball bearing as claimed in claim 1, wherein said metallic soap is a metal salt of an organic fatty acid or a metal salt of an organic hydroxyl fatty acid.

11. The ball bearing as claimed in claim 1, wherein the worked penetration of said grease is 250 to 330.

12. The ball bearing as claimed in claim 1, wherein the radius of curvature of the cross-sectional shape of said outer raceway is larger than the radius of curvature of the cross-sectional shape of said inner raceway.

13. The ball bearing as claimed in claim 1, wherein said ball bearing has an internal clearance in the bearing itself, and is used at least under the application of an axial load with a contact angle other than 0°.

14. The ball bearing as claimed in claim 13, wherein a contact point angle at which the spherical part constituting the pocket comes in sliding contact with the rolling surface of each ball is larger than the contact angle of the ball bearing.

15. A ball bearing comprising an outer ring having on its inner periphery an outer raceway, an inner ring having on its outer periphery an inner raceway, plural balls rotatably disposed between said outer raceway and said inner raceway, a cage holding said plural balls in a freely rotatable manner, and a grease packed in a space between said outer raceway and said inner raceway, wherein said grease comprises a base oil comprising a lubricant having a polar group in its molecular structure and a non-polar lubricant and a metallic soap-based thickener containing a long fibrous material whose fiber length is at least 3 $\mu$m in an amount of at least 30% by mass based on the total amount of the thickener; the inner peripheral surface of each pocket of the cage comprises a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket; and the radius of curvature of the cross-sectional shape of said inner raceway is in the range from 50.5% to 56.0% of the diameter of each ball, and the radius of curvature of the cross-sectional shape of said outer raceway is in the range from 53.0% to 58.0% of the diameter of each ball.

16. The ball bearing as claimed in claim 15, wherein the radius of curvature of said curved part of said cage is infinite.

17. The ball bearing as claimed in claim 15, wherein said base oil comprises a lubricant having a polar group in an amount of 5 to 70% by mass based on total amount of the base oil.

18. A ball bearing comprising an outer ring having on its inner periphery an outer raceway, an inner ring having on its outer periphery an inner raceway, plural balls rotatably disposed between said outer raceway and said inner raceway, a cage holding said plural balls in a freely rotatable manner, and a grease packed in a space between said outer raceway and said inner raceway, wherein said grease comprises a base oil and a metallic soap-based thickener containing a fibrous material whose fiber length is at least 3 μm in an amount smaller than 30% by mass based on the total amount of the thickener; the inner peripheral surface of each pocket of the cage comprises a spherical part consisting of a spherical concave surface whose radius of curvature is slightly larger than that of each ball and a curved part which has the radius of curvature being larger than that of the spherical part and is smoothly continuous from the end of the spherical part toward the end thereof on the opening side of the pocket; and the radius of curvature of the cross-sectional shape of said inner raceway is in the range from 51.5% to 56.0% of the diameter of each ball and the radius of curvature of the cross-sectional shape of said outer raceway is in the range from 52.5% to 58.0% of the diameter of each ball.

19. The ball bearing as claimed in claim 18, wherein the radius of curvature of said curved part of said cage is infinite.

20. The ball bearing as claimed in claim 18, wherein said base oil has a kinematic viscosity of 25 to 150 mm²/s at 40° C.

21. The ball bearing as claimed in claim 18, wherein said metallic soap is a metal salt of an organic fatty acid or a metal salt of an organic hydroxyl fatty acid.

22. The ball bearing as claimed in claim 18, wherein the worked penetration of said grease is 250 to 330.

23. The ball bearing as claimed in claim 18, wherein the radius of carvature of the cross-sectional shape of said outer raceway is larger than the radius of carvature of the cross-sectional shape of said inner raceway.

24. The ball bearing as claimed in claim 18, wherein said ball bearing has an internal clearance in the bearing itself, and is used at least under the application of an axial load with a contact angle other than 0°.

25. The ball bearing as claimed in claim 24, wherein a contact point angle at which the spherical part constituting the pocket comes in sliding contact with the rolling surface of each ball is larger than the contact angle of the ball bearing.

26. A ball bearing comprising an outer ring having on its inner periphery an outer raceway, an inner ring having on its outer periphery an inner raceway, plural balls rotatably disposed between said outer raceway and said inner raceway, a cage holding said plural balls in a freely rotatable manner, and a grease packed in a space between said outer raceway and said inner raceway, wherein said grease comprises a base oil comprising a lubricant having a polar group in its molecular structure and a non-polar lubricant, and a metallic soap-based thickener containing a long fibrous material whose fiber length is at least 3 μm in an amount of at least 30% by mass based on the total amount of the thickener; the cage is in the shape of circular ring as a whole and comprises pockets for receiving and holding the respective balls with its pocket surface at plural places in its circumferential direction and an opening whose width is smaller than the diameter of the ball on one side of the axial direction of each pocket, while a ratio δ/Da of an axial clearance δ provided between the rolling surface of the ball in the axial direction and the pocket surface to the diameter Da of each ball is set in a range from −0.01 to 0.02; and the radius of curvature of the cross-sectional shape of said inner raceway and the radius of curvature of the cross-sectional shape of said outer raceway are in the range from 51.0% to smaller than 60.0% of the diameter of each ball.

27. The ball bearing as claimed in claim 26, wherein the pocket surfaces comprise a pair of first pocket surfaces which are provided inside the opening and a second pocket surface which is provided between the first pocket surfaces, wherein a center of radius of curvature of the first pocket surface is shifted in the axial direction or a circumferential direction from a center of radius of curvature of the second pocket surface which is almost coincised with a rolling center of each ball.

28. The ball bearing as claimed in claim 26, wherein the ball bearing comprises internal clearance in the bearing itself, and is used at least under an application of an axial load, while at least three of the pockets satisfy the ratio δ/Da of the axial clearance δ provided between the rolling surface of the ball in the axial direction and the pocket surface to the diameter Da of each ball being in the range from −0.01 to 0.02.

29. A ball bearing comprising an outer ring having on its inner periphery an outer raceway, an inner ring having on its outer periphery an inner raceway, plural balls rotatably disposed between said outer raceway and said inner raceway, a cage holding said plural balls in a freely rotatable manner, and a grease packed in a space between said outer raceway and said inner raceway, wherein said grease comprises a base oil, and a metallic soap-based thickener containing a fibrous material whose fiber length is at least 3 μm in an amount smaller than 30% by mass based on the total amount of the thickener; the cage is in the shape of circular ring as a whole and comprises pockets for receiving and holding the respective balls with its pocket surface at plural places in its circumferential direction and an opening whose width is smaller than the diameter of the ball on one side of the axial direction of each pocket, while a ratio δ/Da of an axial clearance δ provided between the rolling surface of the ball in the axial direction and the pocket surface to the diameter Da of each ball is set in a range from −0.01 to 0.02; and the radius of curvature of the cross-sectional shape of said inner raceway is in the range from 51.5% to 56.0% of the diameter of each ball and the radius of curvature of the cross-sectional shape of said outer raceway is in the range from 52.5% to 58.0% of the diameter of each ball.

30. The ball bearing as claimed in claim 29, wherein the pocket surfaces comprise a pair of first pocket surfaces which are provided inside the opening and a second pocket surface which is provided between the first pocket surfaces, wherein a center of radius of curvature of the first pocket surface is shifted in the axial direction or a circumferential direction from a center of radius of curvature of the second pocket surface which is almost coincised with a rolling center of the ball.

31. The ball bearing as claimed in claim 29, wherein the ball bearing comprises internal clearance in the bearing itself, and is used at least under an application of an axial load, while at least three of the pockets satisfy the ratio δ/Da of the axial clearance δ provided between the rolling surface of the ball in the axial direction and the pocket surface to the diameter Da of each ball being in the range from −0.01 to 0.02.

* * * * *